US011632568B2

(12) United States Patent
Jang et al.

(10) Patent No.: US 11,632,568 B2
(45) Date of Patent: Apr. 18, 2023

(54) IMAGE DECODING METHOD FOR PERFORMING INTER-PREDICTION WHEN PREDICTION MODE FOR CURRENT BLOCK ULTIMATELY CANNOT BE SELECTED, AND DEVICE FOR SAME

(71) Applicant: LG ELECTRONICS INC., Seoul (KR)

(72) Inventors: Hyeongmoon Jang, Seoul (KR); Naeri Park, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/555,190

(22) Filed: Dec. 17, 2021

(65) Prior Publication Data
US 2022/0116645 A1  Apr. 14, 2022

Related U.S. Application Data

(63) Continuation of application No. PCT/KR2020/007944, filed on Jun. 19, 2020.
(Continued)

(51) Int. Cl.
*H04N 19/52* (2014.01)
*H04N 19/70* (2014.01)
(Continued)

(52) U.S. Cl.
CPC .......... *H04N 19/52* (2014.11); *H04N 19/105* (2014.11); *H04N 19/109* (2014.11);
(Continued)

(58) Field of Classification Search
CPC .... H04N 19/52; H04N 19/105; H04N 19/176; H04N 19/70; H04N 19/139; H04N 19/119; H04N 19/109; H04N 19/132
See application file for complete search history.

(56) References Cited

U.S. PATENT DOCUMENTS

2015/0172657 A1   6/2015   Chong et al.
2017/0105021 A1   4/2017   Lim et al.
(Continued)

FOREIGN PATENT DOCUMENTS

KR   10-2014-0016974 A   2/2014
KR   10-2015-0110357 A   10/2015
(Continued)

OTHER PUBLICATIONS

Chen, "Non-CE4: Regular merge flag coding', JVET-M0231, Joint Video Experts Team (JVET) of ITU-T SG 16 WP 3 and ISO/IEC JTC 1/SC 29/WG 11", 13th Meeting: Marrakech, MA, Jan. 9, 2019, pp. 1-2.
(Continued)

*Primary Examiner* — Anner N Holder
(74) *Attorney, Agent, or Firm* — Dentons US LLP

(57) ABSTRACT

The present disclosure relates to an image decoding and encoding method which can efficiently perform inter-prediction by applying a regular merge mode to the current block on the basis of the case in which an MMVD mode, a merge sub-block mode, a CIIP mode, and a partitioning mode, in which prediction is performed by dividing the current block into two partitions, are not available for the current block.

12 Claims, 20 Drawing Sheets

Related U.S. Application Data

(60) Provisional application No. 62/863,810, filed on Jun. 19, 2019.

(51) Int. Cl.
*H04N 19/105* (2014.01)
*H04N 19/109* (2014.01)
*H04N 19/119* (2014.01)
*H04N 19/132* (2014.01)
*H04N 19/139* (2014.01)
*H04N 19/176* (2014.01)

(52) U.S. Cl.
CPC ......... *H04N 19/119* (2014.11); *H04N 19/132* (2014.11); *H04N 19/139* (2014.11); *H04N 19/176* (2014.11); *H04N 19/70* (2014.11)

(56) References Cited

U.S. PATENT DOCUMENTS

| | | | |
|---|---|---|---|
| 2017/0251213 A1* | 8/2017 | Ye | H04N 19/159 |
| 2018/0124398 A1* | 5/2018 | Park | H04N 19/107 |
| 2018/0199064 A1 | 7/2018 | Ikai et al. | |
| 2019/0379901 A1* | 12/2019 | Chiang | H04N 19/52 |
| 2020/0195973 A1* | 6/2020 | Xu | H04N 19/70 |
| 2021/0014499 A1* | 1/2021 | Lee | H04N 19/176 |
| 2021/0021861 A1* | 1/2021 | Lee | H04N 19/577 |
| 2021/0243476 A1* | 8/2021 | Ko | H04N 19/70 |

FOREIGN PATENT DOCUMENTS

| | | | |
|---|---|---|---|
| KR | 10-2019-0039620 A | 4/2019 | |
| RU | 2434360 C2 | 11/2011 | |
| WO | 2008157269 A2 | 12/2008 | |
| WO | 2011145601 A1 | 11/2011 | |
| WO | 2015142057 A1 | 9/2015 | |
| WO | WO-2019194653 A1 * | 10/2019 | |
| WO | 2020142448 A1 | 7/2020 | |

OTHER PUBLICATIONS

Y-W Chen et al., "CE4: Regular merge flag coding (CE4-1.2.a and CE4-1.2.b)", Joint Video Experts Team (JVET) of ITU-T SG 16 WP 3 and ISO/IEC JTC 1/SC 29/WG 11, Mar. 19-27, 2019, JVET-N0324, XP030203307A.

K. Abe et al., "Non-CE4: Undefined condition of merge mode syntax", Joint Video Experts Team (JVET) of ITU-T SG 16 WP 3 and ISO/IEC JTC 1/SC 29/WG 11, Jul. 3-12, 2019, JVET-O0305-v1, XP030219209A.

L. Wang et al., "Merge Mode Syntax", Joint Video Experts Team (JVET) of ITU-T SG 16 WP 3 and ISO/IEC JTC 1/SC 29/WG 11, Jul. 3-12, 2019, JVET-O0560, XP030219908A.

B. Gross et al., "Versatile Video Coding (Draft 4)", Joint Video Experts Team (JVET) of ITU-T SG 16 WP 3 and ISO/IEC JTC 1/SC 29/WG 11, JVET-M1001-v7, XP030255166A.

Y-W Chen et al., "CE4: Regular merge flag coding (CE4-1.2.a and CE4-1.2.b)", Joint Video Experts Team (JVET) of ITU-T SG 16 WP 3 and ISO/IEC JTC 1/SC 29/WG 11, Mar. 19-27, 2019, JVET-N0324_WD, XP030203308A.

B. Gross et al., "Versatile Video Coding (Draft 5)", Joint Video Experts Team (JVET) of ITU-T SG 16 WP 3 and ISO/IEC JTC 1/SC 29/WG 11, Mar. 19-27, 2019, JVET-N1001-v8.

Bross et al., XP030202602 (JVET-M1001-v6): Joint Video Experts Team (JVET) of ITU-T SG 16 WP 3 and ISO/IEC JTC 1/SC 29/WG 11, 13th Meeting: Marrakech, MA, Jan. 18-19, 2019, "Versatile Video Coding (Draft 4)," (294 Pages).

* cited by examiner

Translate

Scale

Rotate

Shear

IMAGE DECODING METHOD FOR PERFORMING INTER-PREDICTION WHEN PREDICTION MODE FOR CURRENT BLOCK ULTIMATELY CANNOT BE SELECTED, AND DEVICE FOR SAME

This application is the Continuation Bypass of International Application No. PCT/KR2020/007944, filed on Jun. 19, 2020, which claims the benefit of U.S. Provisional Application No. 62/863,810, filed on Jun. 19, 2019, the contents of which are all hereby incorporated by reference herein in their entirety.

BACKGROUND OF THE DISCLOSURE

Field of the Disclosure

The present disclosure relates to an image decoding method for performing inter prediction when a prediction mode is not finally selected for a current block, and an apparatus thereof.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The present disclosure provides a method and apparatus for increasing image coding efficiency.

The present disclosure also provides a method and apparatus for deriving a prediction sample based on a default merge mode.

The present disclosure also provides a method and apparatus for deriving a prediction sample by applying a regular merge mode as a default merge mode.

In an aspect, an image decoding method performed by a decoding apparatus is provided. The method includes: receiving image information including inter prediction mode information through a bit stream; generating a merge candidate list of a current block based on the inter prediction mode information; deriving motion information of the current block based on a candidate selected from the merge candidate list; and generating prediction samples of the current block based on the motion information, wherein a regular merge mode is applied to the current block based on that a merge mode is available for the current block based on the general merge flag and a merge mode with motion vector difference (MMVD) mode, a merge subblock mode, a combined inter-picture merge and intra-picture prediction (CIIP) mode, and a partitioning mode in which prediction is performed by dividing the current block into two partitions are not available, and the merge candidate list is generated by applying the regular merge mode to the current block.

In an aspect, an image encoding method performed by an encoding apparatus is provided. The method includes: determining an inter prediction mode of a current block and generating inter prediction mode information indicating the inter prediction mode; generating a merge candidate list of the current block based on the inter prediction mode; generating selection information indicating one of candidates included in the merge candidate list; and encoding image information including the inter prediction mode information and the selection information, wherein a regular merge mode is applied to the current block based on that a merge mode is available for the current block based on the general merge flag and a merge mode with motion vector difference (MMVD) mode, a merge subblock mode, a combined inter-picture merge and intra-picture prediction (CIIP) mode, and a partitioning mode in which prediction is performed by dividing the current block into two partitions are not available, and the merge candidate list is generated by applying the regular merge mode to the current block.

In another aspect, there is provided a computer-readable storage medium storing encoded information causing an image decoding apparatus to perform an image decoding method, wherein the image decoding method includes: acquiring image information including inter prediction mode information and residual information through a bitstream; generating a merge candidate list of a current block based on the inter prediction mode information; deriving motion information of the current block based on a candidate selected from the merge candidate list; and generating prediction samples of the current block based on the motion information, wherein a regular merge mode is applied to the current block based on that a merge mode is available for the current block based on the general merge flag and a merge mode with motion vector difference (MMVD) mode, a merge subblock mode, a combined inter-picture merge and intra-picture prediction (CIIP) mode, and a partitioning mode in which prediction is performed by dividing the current block into two partitions are not available, and the merge candidate list is generated by applying the regular merge mode to the current block.

Advantageous Effects

According to the present disclosure, overall image/video compression efficiency may be improved.

According to the present disclosure, inter prediction may be efficiently performed by applying a default merge mode when a merge mode is not finally selected.

According to the present disclosure, when the merge mode is not finally selected, the regular merge mode is applied and motion information is derived based on a candidate indicated by merge index information, thereby efficiently performing inter prediction.

DESCRIPTION OF EXEMPLARY EMBODIMENTS

Figure 1:
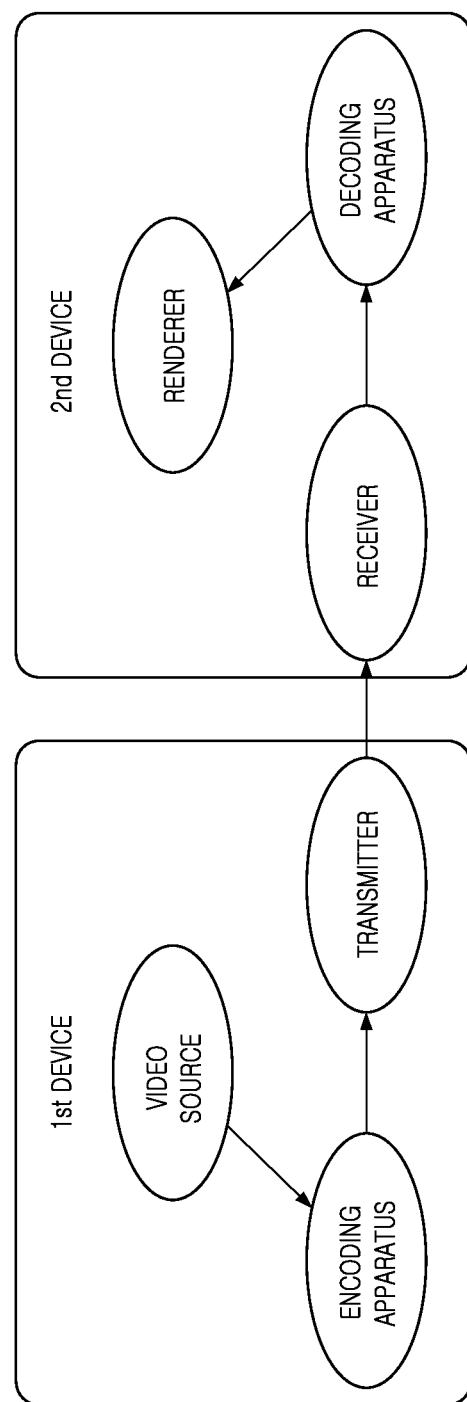
FIG. 1 schematically shows an example of a video/image coding system to which embodiments of the present disclosure is applied.

The present disclosure may be variously modified and have several exemplary embodiments. Therefore, specific exemplary embodiments of the present disclosure will be illustrated in the accompanying drawings and be described in detail. However, this is not intended to limit the present disclosure to specific embodiments. Terms used in the present specification are used only in order to describe specific exemplary embodiments rather than limiting the present disclosure. Singular forms are intended to include plural forms unless the context clearly indicates otherwise. It is to be understood that terms "include", "have", or the like, used in the present specification specify the presence of features, numerals, steps, operations, components, parts, or a combination thereof stated in the present specification, but do not preclude the presence or addition of one or more other features, numerals, steps, operations, components, parts, or a combination thereof.

Meanwhile, each component in the drawings described in the present disclosure is illustrated independently for convenience of description regarding different characteristic functions, and does not mean that each component is implemented as separate hardware or separate software. For example, two or more components among each component may be combined to form one component, or one component may be divided into a plurality of components. Embodiments in which each component is integrated and/or separated are also included in the scope of the present disclosure.

In the present disclosure, "A or B" may mean "only A", "only B" or "both A and B". In other words, "A or B" in the present disclosure may be interpreted as "A and/or B". For example, in the present disclosure, "A, B, or C" means "only A", "only B", "only C", or "any and any combination of A, B, and C".

A slash (/) or comma (comma) used in the present disclosure may mean "and/or". For example, "A/B" may mean "and/or B". Accordingly, "A/B" may mean "only A", "only B", or "both A and B." For example, "A, B, C" may mean "A, B, or C".

In the present specification, "at least one of A and B" may mean "only A", "only B", or "both A and B". Further, in the present specification, the expression "at least one of A or B" or "at least one of A and/or B" may be interpreted the same as "at least one of A and B".

Further, in the present specification, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

Hereinafter, embodiments of the present disclosure will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present disclosure may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to video/image coding. For example, the method/embodiment disclosed in the present disclosure may be applied to the methods disclosed in a versatile video coding (VVC) standard, an essential video coding (EVC) standard, an AOMedia Video 1 (AV1) standard, 2nd generation of audio video coding standard (AVS2), or a next-generation video/image coding standard (ex. H.267 or H.268, etc).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles.

A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may comprise a number of complete tiles or a number of consecutive CTU rows in one tile of a picture that may be contained in one NAL unit. In this document, tile group and slice can be used interchangeably. For example, in this document, a tile group/tile group header may be referred to as a slice/slice header.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

Figure 2:
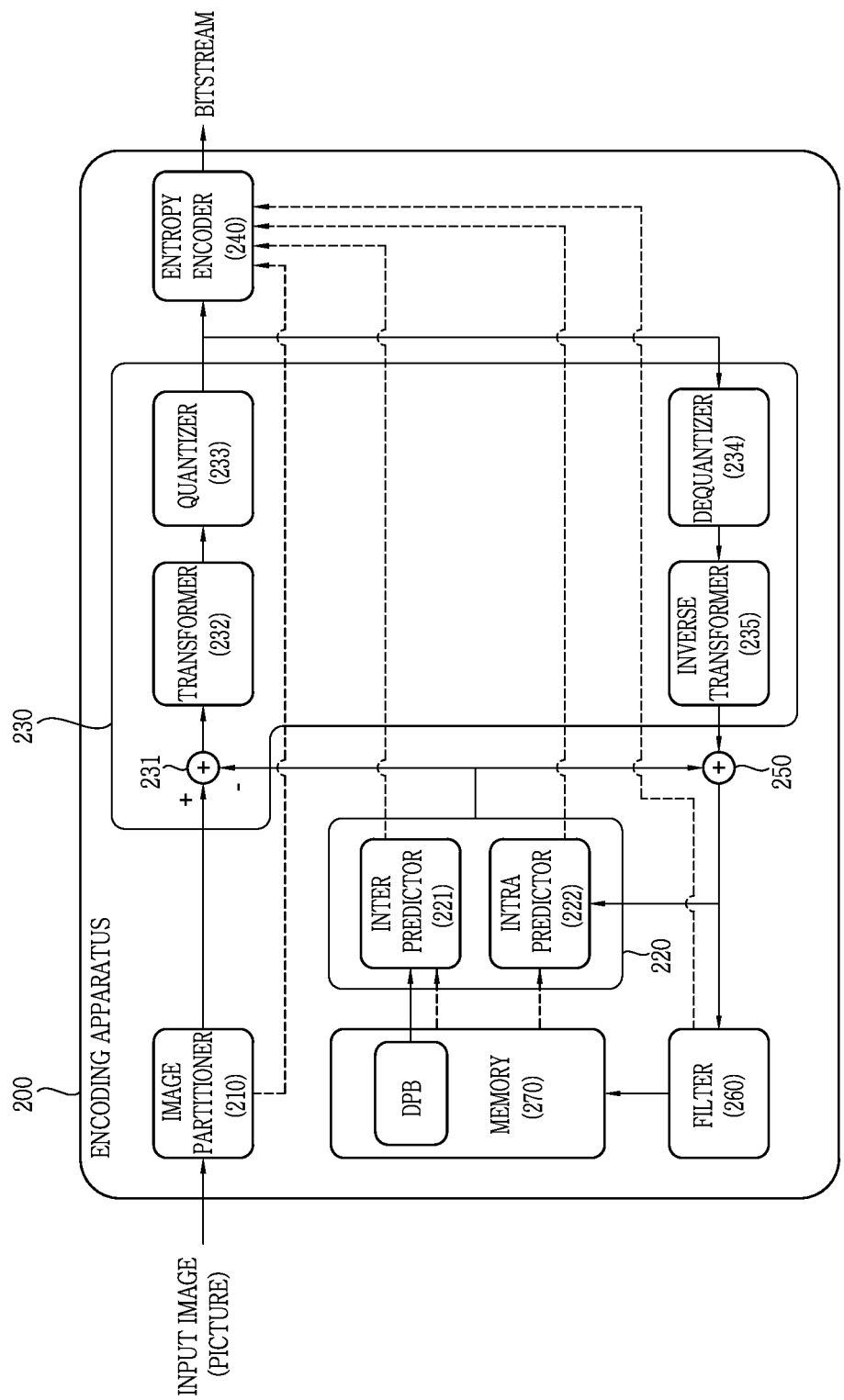
FIG. 2 is a diagram schematically illustrating a configuration of a video/image encoding apparatus to which embodiments of the present document may be applied.

FIG. 2 is a diagram schematically illustrating the configuration of a video/image encoding apparatus to which the disclosure of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a predictor (PU) or a transform unit (TU). In this case, each of the predictor and the transform unit may be split or partitioned from the aforementioned final coding unit. The predictor may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor may perform prediction on a processing target block (hereinafter, referred to as a current block) and generate a predicted block including prediction samples for the current block. The predictor may determine whether intra prediction or inter prediction is applied in units of a current block or CU. The predictor may generate various information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in this document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve Transform (KLT), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form. The entropy encoder 240 may perform various encoding methods such as, for example, exponential Golomb, context-adaptive rvaiable length coding (CAVLC), and context-adaptive binary arithmetic coding (CABAC). The entropy encoder 240 may encode information necessary for video/image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In this document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Meanwhile, in this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

Further, in this document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of this document as well.

Figure 3:
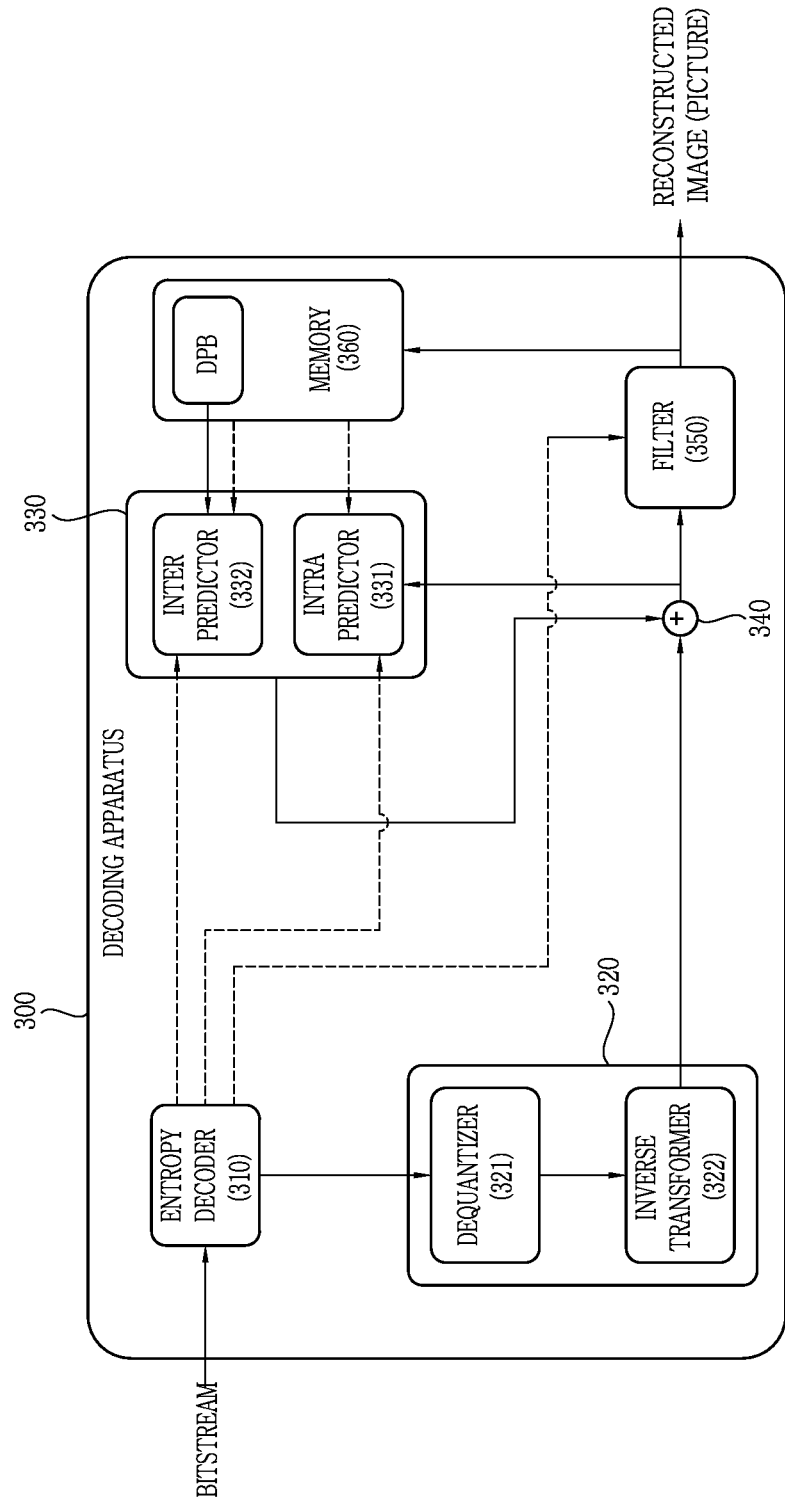
FIG. 3 is a diagram schematically illustrating a configuration of a video/image decoding apparatus to which embodiments of the present document may be applied.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in this document. The palette mode may be considered as an example of intra coding or intra prediction. When the palette mode is applied, information on the palette table and the palette index may be included in the video/image information and signaled.

The intra predictor 3321 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In this disclosure, the embodiments described in the filter 260, the inter predictor 221, and the intra predictor 222 of the encoding apparatus 200 may be applied equally or to correspond to the filter 350, the inter predictor 332, and the intra predictor 331.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, various inter prediction modes may be used for prediction of a current block within a picture. Various inter prediction modes are described below with reference to FIG. 5.

Meanwhile, information indicating whether or not the list0 (L0) prediction, list1 (L1) prediction, or bi-prediction described above is used in the current block (current coding unit) may be signaled to the current block. Said information may be referred to as motion prediction direction information, inter prediction direction information, or inter prediction indication information, and may be constructed/encoded/signaled in the form of, for example, an inter_pred_idc syntax element. That is, the inter_pred_idc syntax element may indicate whether or not the above-described list0 (L0) prediction, list1 (L1) prediction, or bi-prediction is used for the current block (current coding unit). In the present disclosure, for convenience of description, the inter prediction type (L0 prediction, L1 prediction, or BI prediction) indicated by the inter_pred_idc syntax element may be represented as a motion prediction direction. L0 prediction may be represented by pred_L0; L1 prediction may be represented by pred_L1; and bi-prediction may be represented by pred_BI. For example, the following prediction type may be indicated according to the value of the inter_pred_idc syntax element.

As described above, one picture may include one or more slices. A slice may have one of the slice types including intra (I) slice, predictive (P) slice, and bi-predictive (B) slice. The slice type may be indicated based on slice type information. For blocks in I slice, inter prediction is not used for prediction, and only intra prediction may be used. Of course, even in this case, the original sample value may be coded and signaled without prediction. For blocks in P slice, intra prediction or inter prediction may be used, and when inter prediction is used, only uni prediction may be used. Meanwhile, intra prediction or inter prediction may be used for blocks in B slice, and when inter prediction is used, up to the maximum bi-prediction may be used.

L0 and L1 may include reference pictures encoded/decoded before the current picture. For example, L0 may include reference pictures before and/or after the current picture in POC order, and L1 may include reference pictures after and/or before the current picture in POC order. In this case, a reference picture index lower relative to reference pictures earlier than the current picture in POC order may be allocated to L0, and a reference picture index lower relative to reference pictures later than the current picture in POC order may be allocated to L1. In the case of B slice, bi-prediction may be applied, and in this case, unidirectional bi-prediction may be applied, or bi-directional bi-prediction may be applied. Bi-directional bi-prediction may be referred to as true bi-prediction.

For example, information on the inter prediction mode of the current block may be coded and signaled at a CU (CU syntax) level or the like, or may be implicitly determined according to a condition. In this case, some modes may be explicitly signaled, and other modes may be implicitly derived.

For example, the CU syntax may carry information on the (inter) prediction mode, etc. The CU syntax may be as shown in Table 1 below.

TABLE 1

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|     !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = =0 && slice_type != I | |
|     && !( cbWidth = = 4 && cbHeight = = 4 ) ) | |
|       pred_mode_flag | ae(v) |
|     if( ( ( slice_type = = I && cu_skip_flag[ x0 ][ y0 ] = =0 ) \|\| | |
|     ( slice type != I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \|\| cbHeight != 128 ) ) | |
|       pred_mode_ibc_flag | ae(v) |
|   } | |
|   if( CuPredMode[ x0 ][y0 ] = = MODE_INTRA ) { | |
|     if( sps_pcm_enabled_flag && | |
|     cbWidth >= MinIpcmCbSizeY && cbWidth <= MaxIpcmCbSizeY && | |
|     cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( cbWidth <= 32 && cbHeight <= 32 ) | |
|           intra_bdpcm_flag[ x0 ][ y0 ] | ae(v) |
|         if( intra_bdpcm_flag[ x0 ][ y0 ] ) | |
|           intra_bdpcm_dir_flag[ x0 ][ y0 ] | ae(v) |
|         else { | |
|           if( sps_mip_enabled_flag && | |
|           ( Abs( Log2( cbWidth ) − Log2( cbHeight ) ) <= 2 ) && | |
|           cbWidth <= MaxTbSizeY && cbHeight <= MaxTbSizeY ) | |
|             intra_mip_flag[ x0 ][ y0 ] | ae(v) |
|           if( intra_mip_flag[ x0 ][ y0 ] ) { | |
|             intra_mip_mpm_flag[ x0 ][ y0 ] | ae(v) |
|             if( intra_mip_mpm_flag[ x0 ][ y0 ] ) | |
|               intra_mip_mpm_idx[ x0 ][ y0 ] | ae(v) |
|             else | |
|               intra_mip_mpm_remainder[ x0 ][ y0 ] | ae(v) |
|           } else { | |
|             if( sps_mrl_enabled_flag && ( ( y0 % CtbSizeY ) > 0 ) ) | |
|               intra_luma_ref_idx[ x0 ][ y0 ] | ae(v) |
|             if ( sps_isp_enabled_flag && intra_luma_ref_idx[ x0 ][ y0 ] = = 0 && | |
|             ( cbWidth <= MaxTbSizeY && cbHeight <= MaxTbSizeY ) && | |
|             ( cbWidth * cbHeight > MinTbSizeY * MinTbSizeY ) ) | |
|               intra_subpartitions_mode_flag[ x0 ][ y0 ] | ae(v) |
|             if( intra_subpartitions_mode_flag[ x0 ][ y0 ] = = 1 && | |
|             cbWidth <= MaxTbSizeY && cbHeight <= MaxTbSizeY ) | |
|               intra_subpartitions_split_flag[ x0 ][ y0 ] | ae(v) |
|             if( intra_luma_ref_idx[ x0 ][ y0 ] = = 0 && | |
|             intra_subpartitions_mode_flag[ x0 ][ y0 ] = = 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx[ x0 ][ y0 ] = = 0 ) | |
|                 intra_luma_not_planar_flag[ x0 ][ y0 ] | ae(v) |
|               if( intra_luma_not_planar_flag[ x0 ][ y0 ] ) | |
|                 intra_luma_mpm_idx[ x0 ][ y0 ] | ae(v) |
|             } else | |
|               intra_luma_mpm_remainder[ x0 ][ y0 ] | ae(v) |
|           } | |

TABLE 1-continued

| | Descriptor |
|---|---|
|     } <br>   } <br>   if( treeType = = SINGLE_TREE || treeType = = DUAL_TREE_CHROMA ) <br>     intra_chroma_pred_mode[ x0 ][ y0 ] <br> } else if( treeType != DUAL_TREE_CHROMA ) { /* MODE_INTER or MODE_IBC */ <br>   if( cu_skip_flag[ x0 ][ y0 ] = = 0 ) <br>     general_merge_flag[ x0 ][ y0 ] <br>   if( general_merge_flag[ x0 ][ y0 ] ) { <br>     merge_data( x0, y0, cbWidth, cbHeight ) <br>   } else if ( CuPredMode[ x0 ][ y0 ] = = MODE_IBC ) { <br>     mvd_coding( x0, y0, 0, 0 ) <br>     mvp_l0_flag[ x0 ][ y0 ] <br>     if( sps_amvr_enabled_flag && <br>       ( MvdL0[ x0 ][ y0 ][ 0 ] != 0 || MvdL0[ x0 ][ y0 [ 1 ] != 0 ) ) { <br>       amvr_precision_flag[ x0 ][ y0 ] <br>     } <br>   } else { <br>     if( slice_type = = B ) <br>       inter_pred_idc[ x0 ][ y0 ] <br>     if( sps_affine_enabled_flag && cbWidth >= 16 && cbHeight >= 16 ) { <br>       inter_affine_flag[ x0 ][ y0 ] <br>       if( sps_affine_type_flag && inter_affine_flag[ x0 ][ y0 ] ) <br>         cu_affine_type_flag[ x0 ][ y0 ] <br>     } <br>     if( sps_smvd_enabled_flag && inter_pred_idc[ x0 ][ y0 ] = = PRED_BI && <br>       !inter affine flag[ x0 ][y0 ] && RefIdxSymL0 > -1 && RefIdxSymL1 > -1 ) <br>       sym_mvd_flag[ x0 ][ y0 ] <br>     if( inter_pred_idc[ x0 ][ y0 ] != PRED_L1 ) { <br>       if( NumRefIdxActive[ 0 ] > 1 && !sym_mvd_flag[ x0 ][ y0 ] ) <br>         ref_idxl0[ x0 ][ y0 ] <br>       mvd_coding( x0, y0, 0, 0 ) <br>       if( MotionModelIdc[ x0 ][ y0 ] > 0 ) <br>         mvd_coding( x0, y0, 0, 1 ) <br>       if(MotionuModelIdc[ x0 ][y0 ] > 1 ) <br>         mvd_coding( x0, y0, 0, 2 ) <br>       mvp_l0_flag[ x0 ][ y0 ] <br>     } else { <br>       MvdL0[ x0 ][ y0 ][ 0 ] = 0 <br>       MvdL0[ x0 ][ y0 ][ 1 ] = 0 <br>     } <br>     if( inter_pred_idc[ x0 ][ y0 ] != PRED_L0 ) { <br>       if( NumRefIdxActive[ 1 ] > 1 && !sym_mvd_flag[ x0 ][ y0 ] ) <br>         ref_idxl1[ x0 ][ y0 ] <br>       if( mvd_l1_zero_flag && inter_pred_idc[ x0 ][ y0 ] = = PRED_BI ) { <br>         MvdL1[ x0 ][ y0 ][ 0 ] = 0 <br>         MvdL1[ x0 ][ y0 ][ 1 ] = 0 <br>         MvdCpL1[ x0 ][ y0 ][ 0 ][ 0 ] = 0 <br>         MvdCpL1[ x0 ][ y0 ][ 0 ][ 1 ] = 0 <br>         MvdCpL1[ x0 ][ y0 ][ 1 ][ 0 ] = 0 <br>         MvdCpL1[ x0 ][ y0 ][ 1 ][ 1 ] = 0 <br>         MvdCpL1[ x0 ][ y0 ][ 2 ][ 0 ] = 0 <br>         MvdCpL1[ x0 ][ y0 ][ 2 ][ 1 ] = 0 <br>       } else { <br>         if( sym_mvd_flag[ x0 ][ y0 ] ) { <br>           MvdL1[ x0 ][ y0 ][ 0 ] = −MvdL0[ x0 ][ y0 ][ 0 ] <br>           MvdL1[ x0 ][ y0 ][ 1 ] = −MvdL0[ x0 ][ y0 ][ 1 ] <br>         } else <br>           mvd_coding( x0, y0, 1, 0 ) <br>         if( MotionModelIdc[ x0 ][ y0 ] > 0 ) <br>           mvd_coding( x0, y0, 1, 1 ) <br>         if(MotionModelIdc[ x0 ][ y0 ] > 1 ) <br>           mvd_coding( x0, y0, 1, 2 ) <br>         mvp_l1_flag[ x0 ][ y0 ] <br>       } <br>     } else { <br>       MvdL1[ x0 ][ y0 ][ 0 ] = 0 <br>       MvdL1[ x0 ][ y0 ][ 1 ] = 0 <br>     } <br>     if( ( sps_amvr_enabled_flag && inter_affine_flag[ x0 ][ y0 ] = = 0 && <br>       ( MvdL0[ x0 ][ y0 ][ 0 ] != 0 || MvdL0[ x0 ][ y0 ][ 1 ] != 0 || <br>         MvdL1[ x0 ][ y0 ][ 0 ] != 0 || MvdL1[ x0 ][ y0 ][ 1 ] != 0 ) ) || <br>       (sps affine amvr enabled flag && inter affine flag[ x0 ][ y0 ] = = 1 && <br>       ( MvdCpL0[ x0 ][ y0 ][ 0 ][ 0 ] != 0 || MvdCpL0[ x0 ][ y0 ][ 0 ][ 1 ] != 0 || <br>         MvdCpL1[ x0 ][ y0 ][ 0 ][ 0 ] != 0 || MvdCpL1[ x0 ][ y0 ][ 0 ][ 1 ] != 0 | ae(v) <br> ae(v) <br> ae(v) <br> ae(v) <br> ae(v) <br> ae(v) <br> ae(v) <br> ae(v) <br> ae(v) <br> ae(v) <br> ae(v) |

TABLE 1-continued

| | Descriptor |
|---|---|
| `|| MvdCpL0[ x0 ][ y0 ][ 1 ][ 0 ] != 0 || MvdCpL0[ x0 ][ y0 ][ 1 ][ 1 ] != 0` | |
| `|| MvdCpL1[ x0 ][ y0 ][ 1 ][ 0 ] != 0 || MvdCpL1[ x0 ][ y0 ][ 1 ][ 1 ] != 0` | |
| `|| MvdCpL0[ x0 ][ y0 ][ 2 ][ 0 ] != 0 || MvdCpL0[ x0 ][ y0 ][ 2 ][ 1 ] != 0` | |
| `|| MvdCpL1[ x0 ][ y0 ][ 2 ][ 0 ] != 0 || MvdCpL1[ x0 ][ y0 ][ 2 ][ 1 ] != 0 ) ) {` | |
| `    amvr_flag[ x0 ][ y0 ]` | ae(v) |
| `    if( amvr_flag[ x0 ][ y0 ] )` | |
| `        amvr_precision_flag[ x0 ][ y0 ]` | ae(v) |
| `    }` | |
| `    if( sps_bcw_enabled_flag && inter_pred_idc[ x0 ][ y0 ] = = PRED_BI &&` | |
| `        luma_weight_l0_flag[ ref_idx_l0 [ x0 ][ y0 ] ] = = 0 &&` | |
| `        luma_weight_l1_flag[ ref_idx_l1 [ x0 ][ y0 ] ] = = 0 &&` | |
| `        chroma_weight_l0_flag[ ref_idx_l0 [ x0 ][ y0 ] ] = = 0 &&` | |
| `        chroma_weight_l1_flag[ ref_idx_l1 [ x0 ][ y0 ] ] = = 0 &&` | |
| `        cbWidth * cbHeight >= 256 )` | |
| `        bcw_idx[ x0 ][ y0 ]` | ae(v) |
| `    }` | |
| `}` | |
| `if( !pcm_flag[ x0 ][ y0 ] ) {` | |
| `    if( CuPredMode[ x0 ][ y0 ] != MODE_INTRA &&` | |
| `        general_merge_flag[ x0 ][ y0 ] = = 0 )` | |
| `        cu_cbf` | ae(v) |
| `    if( cu_cbf ) {` | |
| `        if( CuPredMode[ x0 ][ y0 ] = = MODE_INTER && sps_sbt_enabled_flag &&` | |
| `            !ciip_flag[ x0 ][ y0 ] && !MergeTriangleFlag[ x0 ][ y0 ] ) {` | |
| `            if( cbWidth <= MaxSbtSize && cbHeight <= MaxSbtSize ) {` | |
| `                allowSbtVerH = cbWidth >= 8` | |
| `                allowSbtVerQ = cbWidth >= 16` | |
| `                allowSbtHorH = cbHeight >= 8` | |
| `                allowSbtHorQ = cbHeight >= 16` | |
| `                if( allowSbtVerH || allowSbtHorH || allowSbtVerQ || allowSbtHorQ )` | |
| `                    cu_sbt_flag` | ae(v) |
| `            }` | |
| `            if( cu_sbt_flag ) {` | |
| `                if( ( allowSbtVerH || allowSbtHorH ) && ( allowSbtVerQ || allowSbtHorQ) )` | |
| `                    cu_sbt_quad_flag` | ae(v) |
| `                if( ( cu_sbt_quad_flag && allowSbtVerQ && allowSbtHorQ ) ||` | |
| `                    ( !cu_sbt_quad_flag && allowSbtVerH && allowSbtHorH ) )` | |
| `                    cu_sbt_horizontal_flag` | ae(v) |
| `                cu_sbt_pos_flag` | ae(v) |
| `            }` | |
| `        }` | |
| `        numSigCoeff = 0` | |
| `        numZeroOutSigCoeff = 0` | |
| `        transform_tree( x0, y0, cbWidth, cbHeight, treeType )` | |
| `        lfnstWidth = ( treeType = = DUAL_TREE_CHROMA ) ? cbWidth / SubWidthC` | |
| `                                                       : cbWidth` | |
| `        lfnstHeight = ( treeType = = DUAL_TREE_CHROMA ) ? cbHeight / SubHeightC` | |
| `                                                        : cbHeight` | |
| `        if( Min( lfnstWidth, lfnstHeight ) >= 4 && sps_lfnst_enabled_flag = = 1 &&` | |
| `            CuPredMode[ x0 ][ y0 ] = = MODE_INTRA &&` | |
| `            IntraSubPartitionsSplitType = = ISP_NO_SPLIT &&` | |
| `            !intra_mip_flag[ x0 ][ y0 ] ) {` | |
| `            if( ( numSigCoeff > ( ( treeType = = SINGLE_TREE ) ? 2 : 1 ) ) &&` | |
| `                numZeroOutSigCoeff = = 0 )` | |
| `                lfnst_idx[ x0 ][ y0 ]` | ae(v) |
| `        }` | |
| `    }` | |
| `  }` | |
| `}` | |

In Table 1, cu_skip_flag may indicate whether skip mode is applied to the current block (CU).

pred_mode_flag equal to 0 may specify that the current coding unit is coded in inter prediction mode. Pred_mode_flag equal to 1 may specify that the current coding unit is coded in intra prediction mode.

pred_mode_ibc_flag equal to 1 may specify that the current coding unit is coded in IBC prediction mode. Pred_mode_ibc_flag equal to 0 may specify that the current coding unit is not coded in IBC prediction mode.

pcm_flag[x0][y0] equal to 1 may specify that the pcm_sample( ) syntax structure is present and the transform_ tree( ) syntax structure is not present in the coding unit including the luma coding block at the location (x0, y0). Pcm_flag[x0][y0] equal to 0 may specify that pcm_sample( ) syntax structure is not present. That is, pcm_flag may represent whether a pulse coding modulation (PCM) mode is applied to the current block. If PCM mode is applied to the current block, prediction, transformation, quantization, etc. Are not applied, and values of the original sample in the current block may be coded and signaled.

intra_mip_flag[x0][y0] equal to 1 may specify that the intra prediction type for luma samples is matrix-based intra prediction (MIP). Intra_mip_flag[x0][y0] equal to 0 may specify that the intra prediction type for luma samples is not matrix-based intra prediction. That is, intra_mip_flag may represent whether an MIP prediction mode (type) is applied to (a luma sample of) the current block.

intra_chroma_pred_mode[x0][y0] may specify the intra prediction mode for chroma samples in the current block.

general_merge_flag[x0][y0] may specify whether the inter prediction parameters for the current coding unit are inferred from a neighbouring inter-predicted partition. That is, general_merge_flag may represent that general merge is available, and when the value of general_merge_flag is 1, regular merge mode, mmvd mode, and merge subblock mode (subblock merge mode) may be available. For example, when the value of general_merge_flag is 1, merge data syntax may be parsed from encoded video/image information (or bitstream), and the merge data syntax configured/coded to include information as shown in Table 2 below.

TABLE 2

| | Descriptor |
|---|---|
| merge_data( x0, y0, cbWidth, cbHeight ) { | |
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag || cbWidth * cbHeight != 32 ) | |
|       regular_merge_flag[ x0 ][ y0 ] | ae(v) |
|     if ( regular_merge_flag[ x0 ][ y0 ] = = 1 ){ | |
|       if( MaxNumMergeCand > 1 ) | |
|         merge_idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] = = 0 && ( cbWidth * cbHeight ) >= 64 && cbWidth < 128 && cbHeight < 128 ) { | |
|             ciip_flag[ x0 ][ y0 ] | ae(v) |
|             if( ciip_flag[ x0 ][ y0 ] && MaxNumMergeCand > 1 ) | |
|               merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | |

In Table 2, regular_merge_flag[x0][y0] equal to 1 may specify that regular merge mode is used to generate the inter prediction parameters of the current coding unit. That is, regular_merge_flag may represent whether the merge mode (regular merge mode) is applied to the current block.

mmvd_merge_flag[x0][y0] equal to 1 may specify that merge mode with motion vector difference is used to generate an inter prediction parameter of a current block. That is, mmvd_merge_flag represents whether MMVD is applied to the current block.

mmvd_cand_flag[x0][y0] may specify whether the first (0) or the second (1) candidate in the merging candidate list is used with the motion vector difference derived from mmvd_distance_idx[x0][y0] and mmvd_direction_idx[x0][y0].

mmvd_distance_idx[x0][y0] may specify the index used to derive MmvdDistance[x0][y0].

mmvd_direction_idx[x0][y0] may specify index used to derive MmvdSign[x0][y0].

merge_subblock_flag[x0][y0] may specify the subblock-based inter prediction parameters for the current block. That is, merge_subblock_flag may represents whether a subblock merge mode (or affine merge mode) is applied to the current block.

merge_subblock_idx[x0][y0] may specify the merging candidate index of the subblock-based merging candidate list.

ciip_flag[x0][y0] may specify whether the combined inter-picture merge and intra-picture prediction (CIIP) is applied for the current coding unit.

merge_triangle_idx0[x0][y0] may specify a first merging candidate index of the triangular shape based motion compensation candidate list.

merge_triangle_idx1[x0][y0] may specify a second merging candidate index of the triangular shape based motion compensation candidate list.

merge_idx[x0][y0] may specify the merging candidate index of the merging candidate list.

Meanwhile, referring back to the CU syntax, mvp_l0_flag[x0][y0] may specify the motion vector predictor index of list 0. That is, when the MVP mode is applied, mvp_l0_flag may represent a candidate selected for MVP derivation of the current block from the MVP candidate list 0.

ref_idx_l1[x0][y0] has the same semantics as ref_idx_l0, with l0 and list 0 may be replaced by l1 and list 1, respectively.

inter_pred_jdc[x0][y0] may specify whether list0, list1, or bi-prediction is used for the current coding unit.

sym_mvd_flag[x0][y0] equal to 1 may specify that the syntax elements ref_idx_l0[x0][y0] and ref_idx_l1[x0][y0], and the mvd_coding(x0, y0, refList, cpIdx) syntax structure for refList equal to 1 are not present. That is, sym_mvd_flag represents whether symmetric MVD is used in mvd coding.

ref_idx_l0[x0][y0] may specify the list 0 reference picture index for the current block.

ref_idx_l1[x0][y0] has the same semantics as ref_idx_l0, with l0, L0 and list 0 replaced by l1, L1 and list 1, respectively.

inter_affine_flag[x0][y0] equal to 1 may specify that affine model-based motion compensation is used to generate prediction samples of the current block when decoding a P or B slice.

cu_affine_type_flag[x0][y0] equal to 1 may specify that for the current coding unit, when decoding a P or B slice, 6-parameter affine model based motion compensation is used to generate the prediction samples of the current coding unit. Cu_affine_type_flag[x0][y0] equal to 0 may specify that 4-parameter affine model based motion compensation is used to generate the prediction samples of the current block.

amvr_flag[x0][y0] may specify the resolution of motion vector difference. The array indices x0, y0 specify the location (x0, y0) of the top-left luma sample of the considered coding block relative to the top-left luma sample of the picture. Amvr_flag[x0][y0] equal to 0 may specify that the resolution of the motion vector difference is ¼ of a luma sample. Amvr_flag[x0][y0] equal to 1 may specify that the resolution of the motion vector difference is further specified by amvr_precision_flag[x0][y0].

amvr_precision_flag[x0][y0] equal to 0 may specify that the resolution of the motion vector difference is one integer luma sample if inter_affine_flag[x0][y0] is equal to 0, and 1/16 of a luma sample otherwise. Amvr_precision_flag[x0][y0] equal to 1 may specify that the resolution of the motion vector difference is four luma samples if inter_affine_flag[x0][y0] is equal to 0, and one integer luma sample otherwise.

bcw_idx[x0][y0] may specify the weight index of bi-prediction with CU weights.

Figure 4:
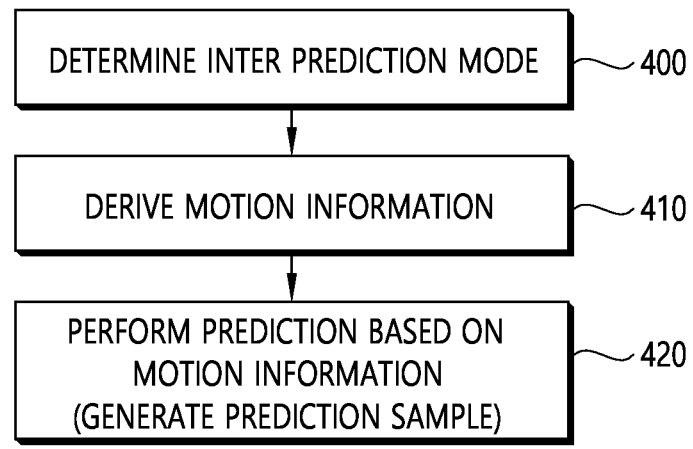
FIG. 4 illustrates an inter prediction procedure.

FIG. 4 exemplarily shows an inter prediction procedure.

Referring to FIG. 4, the inter prediction procedure may include a step of determining an inter prediction mode, a step of deriving motion information according to a determined prediction mode, and a step of performing prediction (generating a prediction sample) based on derived motion information. The inter prediction procedure may be performed by the encoding apparatus and the decoding apparatus as described above. In this document, a coding apparatus may include an encoding apparatus and/or a decoding apparatus.

Referring to FIG. 4, the coding apparatus determines an inter prediction mode for the current block (S400). Meanwhile, various inter prediction modes may be used for prediction of a current block within a picture. Various inter prediction modes may be used for prediction of the current block in a picture. For example, various modes such as merge mode, skip mode, motion vector prediction (MVP) mode, affine mode, subblock merge mode, merge with MVD (MMVD) mode, etc. Decoder side motion vector refinement (DMVR) mode, adaptive motion vector resolution (AMVR) mode, bi-prediction with CU-level weight (BCW), bi-directional optical flow (BDOF), etc. may be used in addition or instead as ancillary modes. The affine mode may be referred to as an affine motion prediction mode. The MVP mode may be referred to as an advanced motion vector prediction (AMVP) mode. In the present disclosure, some modes and/or motion information candidates derived by some modes may be included as one of motion information-related candidates of other modes. For example, the HMVP candidate may be added as a merge candidate of the merge/skip mode, or may be added as an mvp candidate of the MVP mode. When the HMVP candidate is used as a motion information candidate of the merge mode or skip mode, the HMVP candidate may be referred to as an HMVP merge candidate.

The prediction mode information indicating the inter prediction mode of the current block may be signaled from the encoding apparatus to the decoding apparatus. The prediction mode information may be included in a bitstream and received at the decoding apparatus. The prediction mode information may include index information indicating one of multiple candidate modes. Further, the inter prediction mode may be indicated through hierarchical signaling of flag information. In this case, the prediction mode information may include one or more flags. For example, it may be indicated whether the skip mode is applied by signaling the skip flag; it may be indicated whether the merge mode is applied by signaling the merge flag for the skip mode not being applied; and it may be indicated that the MVP mode is applied or a flag for further partition may be further signaled when the merge mode is not applied. The affine mode may be signaled as an independent mode, or may be signaled as a mode dependent on the merge mode, the MVP mode or the like. For example, the affine mode may include an affine merge mode and an affine MVP mode.

The coding apparatus derives motion information for the current block (S410). The motion information may be derived based on the inter prediction mode.

The coding apparatus may perform inter prediction using motion information of the current block. The encoding apparatus may derive optimal motion information for the current block through a motion estimation procedure. For example, the encoding apparatus may search for a similar reference block with high correlation within a predetermined search range in the reference picture by using the original block in the original picture with respect to the current block in fractional pixel units, and derive motion information therethrough. Block similarity may be derived based on a difference between phase-based sample values. For example, the block similarity may be calculated based on a SAD between the current block (or the template of the current block) and the reference block (or the template of the reference block). In this case, motion information may be derived based on a reference block having the smallest SAD in the search area. The derived motion information may be signaled to the decoding apparatus according to various methods based on the inter prediction mode.

The coding apparatus performs inter prediction based on motion information on the current block (S420). The coding apparatus may derive prediction sample(s) for the current block based on the motion information. The current block including the prediction samples may be referred to as a predicted block.

Figure 5:
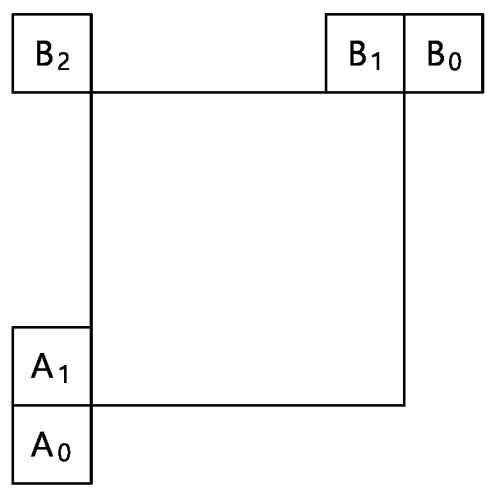
FIG. 5 is a view illustrating a merge mode in inter prediction.

FIG. 5 is a diagram for explaining a merge mode in inter prediction.

When the merge mode is applied, motion information of the current prediction block is not directly transmitted, but motion information of the current prediction block is derived using motion information of a neighboring prediction block. Accordingly, the motion information of the current prediction block may be indicated by transmitting flag information indicating that the merge mode is used and a merge index indicating which prediction block in the vicinity is used. The merge mode may be referred to as a regular merge mode.

In order to perform the merge mode, the encoding apparatus needs to search for a merge candidate block used to derive motion information on the current prediction block. For example, up to five merge candidate blocks may be used, but the embodiment(s) of the present disclosure are not limited thereto. In addition, the maximum number of merge candidate blocks may be transmitted in a slice header or a tile group header, but the embodiment(s) of the present disclosure are not limited thereto. After finding the merge candidate blocks, the encoding apparatus may generate a merge candidate list, and may select a merge candidate block having the smallest cost among the merge candidate blocks as a final merge candidate block.

The present disclosure may provide various embodiments of merge candidate blocks constituting the merge candidate list.

For example, the merge candidate list may include five merge candidate blocks. For example, four spatial merge candidates and one temporal merge candidate may be used. As a specific example, in the case of the spatial merge candidate, the blocks illustrated in FIG. 5 may be used as a spatial merge candidate. Hereinafter, the spatial merge candidate or a spatial MVP candidate to be described below may be referred to as an SMVP, and the temporal merge candidate or a temporal MVP candidate to be described below may be referred to as a TMVP.

The merge candidate list for the current block may be configured, for example, based on the following procedure.

The coding apparatus (encoding apparatus/decoding apparatus) may insert spatial merge candidates derived by searching for spatial neighboring blocks of the current block into the merge candidate list. For example, the spatial neighboring blocks may include a lower-left corner neighboring block, a left neighboring block, an upper-right corner neighboring block, an upper neighboring block, and an upper-left corner neighboring block of the current block. However, this is an example, and in addition to the aforementioned spatial neighboring blocks, additional neighboring blocks such as a right neighboring block, a lower neighboring block, and a lower right neighboring block may be further used as the spatial neighboring blocks. The coding apparatus may detect available blocks by searching the spatial neighboring blocks based on priority, and may derive motion information of the detected blocks as the spatial merge candidates. For example, the encoding apparatus and/or the decoding apparatus may search for five blocks illustrated in FIG. 5 in the order of A1→B1→B0→A0→B2, and may configure a merge candidate list by sequentially indexing the available candidates.

The coding apparatus may search for a temporal neighboring block of the current block and insert a derived temporal merge candidate into the merge candidate list. The temporal neighboring block may be positioned at a reference picture that is a different picture from the current picture in which the current block is positioned. The reference picture in which the temporal neighboring blocks are positioned may be called a collocated picture or a col picture. The temporal neighboring blocks may be searched for in the order of the bottom-right corner neighboring block and the bottom-right center block of the co-located block with respect to the current block on the col picture. Meanwhile, when motion data compression is applied, specific motion information may be stored as representative motion information on each predetermined storage unit in the col picture. In this case, there is no need to store motion information on all blocks in the predetermined storage unit, and through this, a motion data compression effect may be obtained. In this case, the predetermined storage unit may be predetermined as, for example, units of 16×16 samples or units of 8×8 samples, or size information on the predetermined storage unit may be signaled from the encoding apparatus to the decoding apparatus. When the motion data compression is applied, the motion information on the temporally neighboring blocks may be replaced with representative motion information on the predetermined storage unit in which the temporally neighboring blocks are positioned. That is, in this case, from an implementation point of view, instead of the predicted block positioned at the coordinates of the temporally neighboring blocks, the temporal merge candidate may be derived based on the motion information on the prediction block covering the arithmetic left shifted position after arithmetic right shift by a certain value based on the coordinates (top-left sample position) of the temporal neighboring block. For example, when the predetermined storage unit is units of 2n×2n samples, if the coordinates of the temporally neighboring blocks are (xTnb, yTnb), the motion information on the prediction block positioned at the corrected position $((xTnb>>n)<<n), (yTnb>>n)<<n))$ may be used for the temporal merge candidate. Specifically, when the predetermined storage unit is units of 16×16 samples, if the coordinates of the temporally neighboring blocks are (xTnb, yTnb), the motion information on the prediction block positioned at the corrected position $((xTnb>>4)<<4), (yTnb>>4)<<4))$ may be used for the temporal merge candidate. Alternatively, when the predetermined storage unit is units of 8×8 samples, if the coordinates of the temporally neighboring blocks are (xTnb, yTnb), the motion information on the prediction block positioned at the corrected position $((xTnb>>3)<<3), (yTnb>>3)<<3))$ may be used for the temporal merge candidate.

The coding apparatus may check whether the number of current merge candidates is smaller than the number of maximum merge candidates. The maximum number of merge candidates may be predefined or signaled from the encoding apparatus to the decoding apparatus. For example, the encoding apparatus may generate and encode information on the maximum number of merge candidates, and transmit the information to the decoder in the form of a bitstream. When the maximum number of merge candidates is filled, the subsequent candidate addition process may not proceed.

As a result of checking, when the number of the current merge candidates is less than the maximum number of merge candidates, the coding apparatus may insert an additional merge candidate into the merge candidate list. For example, the additional merge candidate may include at least one of history based merge candidate(s), a pair-wise average merge candidate(s), ATMVP, a combined bi-predictive merge candidate (when a slice/tile group type of the current slice/tile group is type B) and/or a zero vector merge candidate.

As a result of the check, when the number of the current merge candidates is not smaller than the maximum number of merge candidates, the coding apparatus may terminate the construction of the merge candidate list. In this case, the encoding apparatus may select an optimal merge candidate from among the merge candidates constituting the merge candidate list based on rate-distortion (RD) cost, and signal selection information indicating the selected merge candidate (ex. merge index) to the decoding apparatus. The decoding apparatus may select the optimal merge candidate based on the merge candidate list and the selection information.

As described above, the motion information on the selected merge candidate may be used as the motion information on the current block, and prediction samples of the current block may be derived based on the motion information on the current block. The encoding apparatus may derive residual samples of the current block based on the prediction samples, and may signal residual information on the residual samples to the decoding apparatus. As described above, the decoding apparatus may generate reconstructed samples based on residual samples derived based on the residual information and the prediction samples, and may generate a reconstructed picture based thereon.

When the skip mode is applied, the motion information on the current block may be derived in the same way as when the merge mode is applied. However, when the skip mode is applied, the residual signal for the corresponding block is omitted, and thus the prediction samples may be directly used as the reconstructed samples. The skip mode may be applied, for example, when the value of the cu_skip_flag syntax element is 1.

Figure 6:
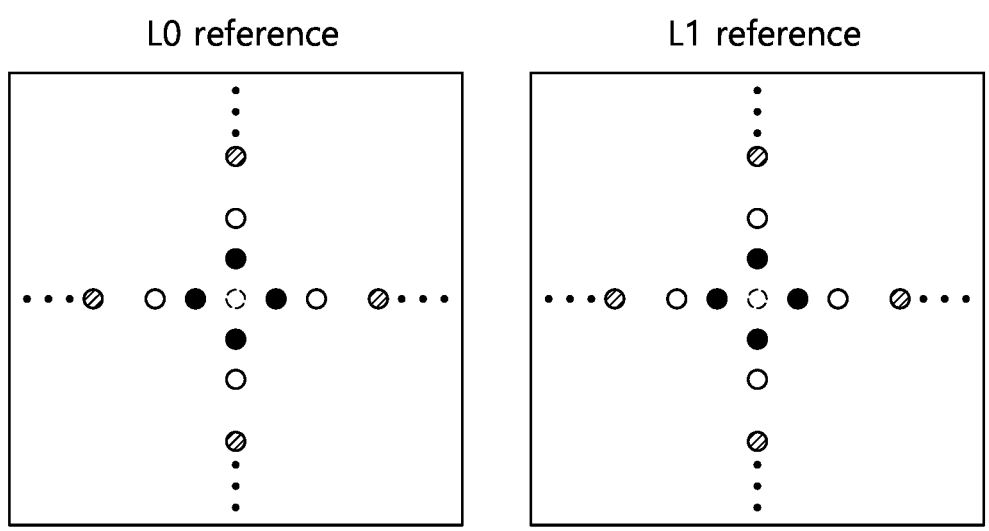
FIG. 6 is a view illustrating a merge mode with motion vector difference mode (MMVD) in inter prediction.

FIG. 6 is a view illustrating a merge mode with motion vector difference (MMVD) mode in inter prediction.

The MMVD mode is a method of applying motion vector difference (MVD) to a merge mode in which motion information derived to generate prediction samples of the current block is directly used.

For example, an MMVD flag (e.g., mmvd_flag) indicating whether to use MMVD for the current block (i.e., a current CU) may be signaled, and MMVD may be performed based on this MMVD flag. When MMVD is applied to the current block (e.g., when mmvd_flag is 1), additional information on MMVD may be signaled.

Here, the additional information on the MMVD may include a merge candidate flag (e.g., mmvd_cand_flag) indicating whether a first candidate or a second candidate in the merge candidate list is used together with the MVD, a distance index for indicating a motion magnitude. (e.g., mmvd_distance_jdx), and a direction index (e.g., mmvd_direction_idx) for indicating a motion direction.

In the MMVD mode, two candidates (i.e., the first candidate or the second candidate) located in first and second entries among the candidates in the merge candidate list may be used, and one of the two candidates (i.e., the first candidate or the second candidate) may be used as a base MV. For example, a merge candidate flag (e.g., mmvd_cand_flag) may be signaled to indicate any one of two candidates (i.e., the first candidate or the second candidate) in the merge candidate list.

In addition, a distance index (e.g., mmvd_distance_idx) indicates motion size information and may indicate a predetermined offset from a start point. Referring to FIG. 5, the offset may be added to a horizontal component or a vertical component of a start motion vector. The relationship between the distance index and the predetermined offset may be shown in Table 3 below.

Referring to Table 3, a distance of the MVD (e.g., MmvdDistance) may be determined according to a value of the distance index (e.g., mmvd_distance_idx), and the distance of the MVD (e.g., MmvdDistance) may be derived using an integer sample precision or fractional sample precision based on the value of slice_fpel_mmvd_enabled_flag. For example, slice_fpel_mmvd_enabled_flag equal to 1 may indicate that the distance of MVD is derived using integer sample units in the current slice, and slice_fpel_mmvd_enabled_flag equal to 0 may indicate that the distance of MVD is derived using fractional sample units in the current slice.

In addition, the direction index (e.g., mmvd_direction_idx) indicates a direction of the MVD with respect to a starting point and may indicate four directions as shown in Table 4 below. In this case, the direction of the MVD may indicate the sign of the MVD. The relationship between the direction index and the MVD code may be expressed as shown in Table 4 below.

TABLE 4

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Referring to Table 4, the sign of the MVD (e.g., MmvdSign) may be determined according to the value of the direction index (e.g., mmvd_direction_idx), and the sign of the MVD (e.g., MmvdSign) may be derived for the L0 reference picture and the L1 reference picture.

Based on the distance index (e.g., mmvd_distance_idx) and direction index (e.g., mmvd_direction_idx) described above, an offset of the MVD may be calculated as shown in Equation 1 below.

$$MmvdOffset[x0][y0][0]=(MmvdDistance[x0][y0]<<2)$$
$$*Mmvd\,Sign[x0][y0][0]$$

$$MmvdOffset[x0][y0][1]=(MmvdDistance[x0][y0]<<2)$$
$$*Mmvd\,Sign[x0][y0][1] \quad \text{[Equation 1]}$$

That is, in the MMVD mode, a merge candidate indicated by a merge candidate flag (e.g., mmvd_cand_flag) is selected from among the merge candidates of the merge candidate list derived based on the neighboring block, and the selected merge candidate may be used as a base candidate (e.g., MVP). In addition, motion information (i.e., motion vector) of the current block may be derived by adding the derived MVD using a distance index (e.g., mmvd_distance_jdx) and a direction index (e.g., mmvd_direction_jdx) based on the base candidate.

TABLE 3

| | MmvdDistance[ x0 ][ y0 ] | |
|---|---|---|
| mmvd_distance_idx[ x0 ][ y0 ] | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Meanwhile, conventionally, only one motion vector may be used to express a motion of a coding block. That is, a translation motion model was used. However, although this method may express an optimal motion in block units, it is not actually an optimal motion of each sample, and coding efficiency may be increased if an optimal motion vector may be determined in a sample unit. To this end, an affine motion model may be used. An affine motion prediction method for coding using an affine motion model may efficiently express four motions as follows.

Figure 7:
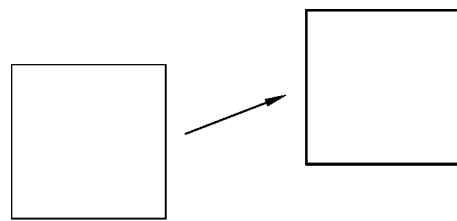
FIG. 7 exemplarily shows a motion expressed through an affine motion model.
Figure 7:
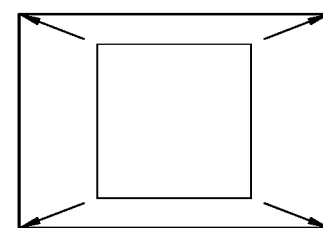
Figure 7:
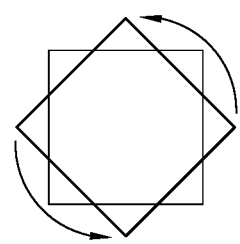
Figure 7:
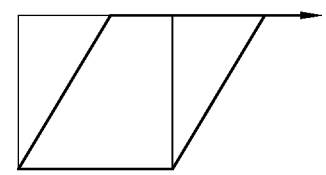

FIG. 7 exemplarily shows a motion expressed through an affine motion model.

Referring to FIG. 7, the motion that may be expressed through the affine motion model may include a translation motion, a scale motion, a rotational motion, and a shear motion. That is, not only the translational motion in which (a portion of) an image moves in a plane with the passage of time shown in FIG. 7, but also the scale motion in which (a portion of) the image is scaled with the passage of time, the rotational motion in which (a portion of) the image rotates with the passage of time, and the shear motion in which (a portion of) the image is transformed into a parallelogram with the passage of time may be efficiently expressed through the affine motion prediction.

The encoding apparatus/decoding apparatus may predict a distortion shape of an image based on motion vectors at control points (CPs) of the current block through the affine motion prediction, and through this, the accuracy of prediction may be increased to improve compression performance of the image. In addition, a motion vector for at least one control point of the current block may be derived using a motion vector of a neighboring block of the current block, thereby reducing the burden of data amount for added additional information and improving inter prediction efficiency considerably.

Among motions that the affine movement model may express, an affine motion model that expresses three motions (translation, scale, rotation) may be called a similarity (or simplified) affine motion model. However, the affine motion model is not limited to the motion model described above.

The affine motion prediction method may express a motion vector in each sample unit of a block using two, three, or four motion vectors.

Figure 8A:
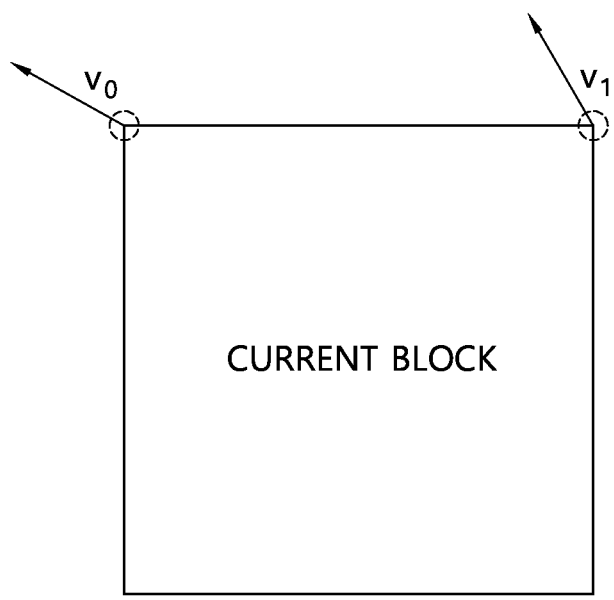
FIGS. 8A and 8B exemplarily show CPMV for affine motion prediction.
Figure 8B:
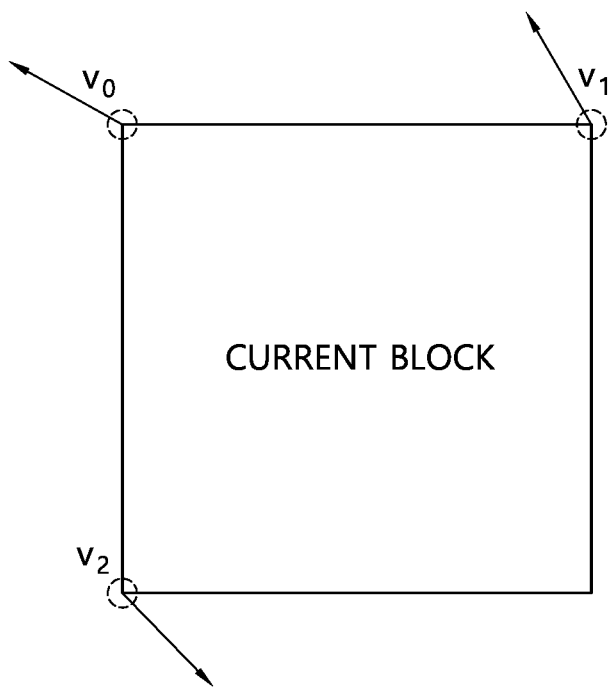

FIGS. 8A and 8B exemplarily show CPMV for affine motion prediction.

Conventionally, only one motion vector may be used to express a motion of a coding block. That is, a translation motion model was used. However, although this method may express an optimal motion in block units, it is not actually an optimal motion of each sample, and coding efficiency may be increased if an optimal motion vector may be determined in a sample unit. To this end, an affine motion model may be used. An affine motion prediction method for coding using an affine motion model may be as follows.

The affine motion prediction method may express a motion vector in each sample unit of a block using two, three, or four motion vectors. For example, the affine motion model may represent four types of motion. The affine motion model, which expresses three movements (translation, scale, and rotation), among the motions that the affine motion model may express, may be called a similarity (or simplified) affine motion model. However, the affine motion model is not limited to the motion model described above.

Affine motion prediction may determine a motion vector of a sample position included in a block using two or more control point motion vectors (CPMV). In this case, the set of motion vectors may be referred to as an affine motion vector field (MVF).

For example, FIG. 8A may show a case in which two CPMVs are used, which may be referred to as a 4-parameter affine model. In this case, the motion vector at the (x, y) sample position may be determined as, for example, Equation.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{[Equation 2]}$$

For example, FIG. 8B may show a case in which three CPMVs are used, which may be referred to as a 6-parameter affine model. In this case, the motion vector at a (x, y) sample position may be determined, for example, by Equation 3.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{[Equation 3]}$$

In Equations 2 and 3, $\{v_x, v_y\}$ may represent a motion vector at the (x, y) position. In addition, $\{v_{0x}, v_{0y}\}$ may indicate the CPMV of a control point (CP) at the top-left corner position of the coding block, $\{v_{1x}, v_{1y}\}$ may indicate the CPMV of the CP at the upper-right corner position, $\{v_{2x}, v_{2y}\}$ may indicate the CPMV of the CP at the lower left corner position. In addition, W may indicate a width of the current block, and H may indicate a height of the current block.

Figure 9:
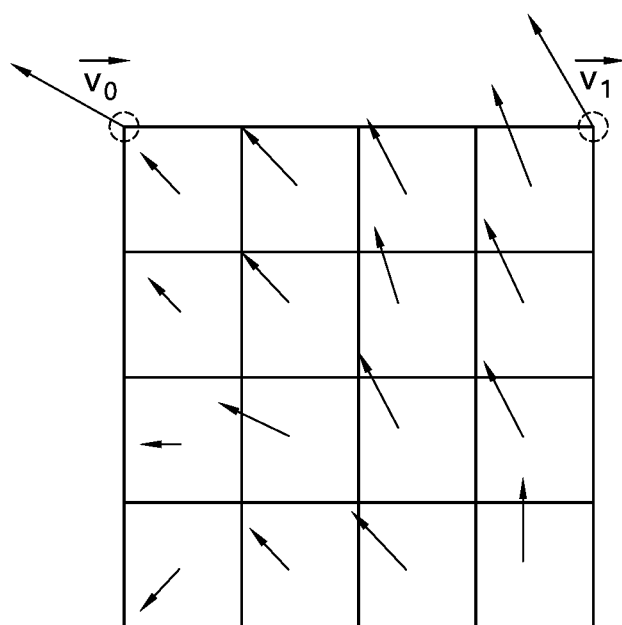
FIG. 9 exemplarily shows a case in which an affine MVF is determined in sub-block units.

FIG. 9 exemplarily illustrates a case in which an affine MVF is determined in units of subblocks.

In the encoding/decoding process, the affine MVF may be determined in units of samples or predefined subblocks. For example, when the affine MVP is determined in units of samples, a motion vector may be obtained based on each sample value. Alternatively, for example, when the affine MVP is determined in units of subblocks, a motion vector of the corresponding block may be obtained based on a sample value of the center of the subblock (the lower right of the center, that is, the lower right sample among the four central samples). That is, in the affine motion prediction, the motion vector of the current block may be derived in units of samples or subblocks.

In the case of FIG. 9, the affine MVF is determined in units of 4×4 subblocks, but the size of the subblocks may be variously modified.

That is, when affine prediction is available, three motion models applicable to the current block may include a translational motion model, a 4-parameter affine motion model, and a 6-parameter affine motion model. The translation motion model may represent a model using an existing block unit motion vector, the 4-parameter affine motion model may represent a model using two CPMVs, and the 6-parameter affine motion model may represent a model using three CPMVs.

Meanwhile, the affine motion prediction may include an affine MVP (or affine inter) mode or an affine merge mode.

Figure 10:
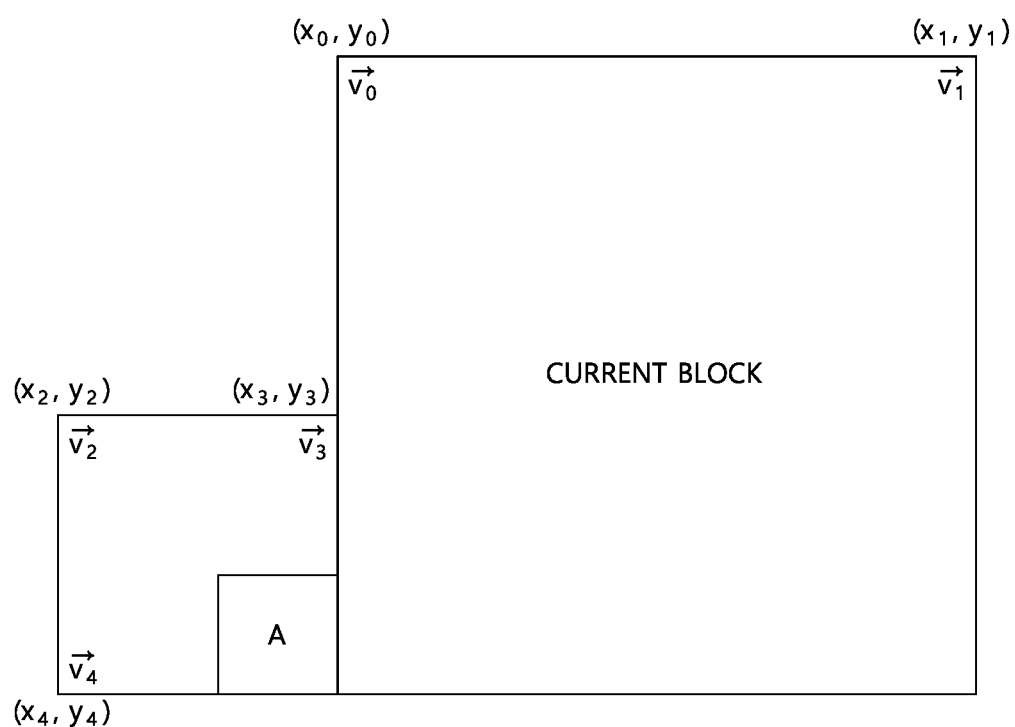
FIG. 10 is a view illustrating an affine merge mode or a subblock merge mode in inter prediction.

FIG. 10 is a view illustrating an affine merge mode or a subblock merge mode in inter prediction.

For example, in the affine merge mode, the CPMV may be determined according to the affine motion model of the neighboring block coded by the affine motion prediction. For example, neighboring blocks coded as affine motion prediction in search order may be used for affine merge mode. That is, when at least one of neighboring blocks is coded in the affine motion prediction, the current block may be coded in the affine merge mode. Here, the fine merge mode may be called AF_MERGE.

When the affine merge mode is applied, the CPMVs of the current block may be derived using CPMVs of neighboring blocks. In this case, the CPMVs of the neighboring block may be used as the CPMVs of the current block as they are, and the CPMVs of the neighboring block may be modified based on the size of the neighboring block and the size of the current block and used as the CPMVs of the current block.

On the other hand, in the case of the affine merge mode in which the motion vector (MV) is derived in units of subblocks, it may be called a subblock merge mode, which may be indicated based on a subblock merge flag (or a merge_subblock_flag syntax element). Alternatively, when the value of the merge_subblock_flag syntax element is 1, it may be indicated that the subblock merge mode is applied. In this case, an affine merge candidate list to be described later may be called a subblock merge candidate list. In this case, the subblock merge candidate list may further include a candidate derived by SbTMVP, which will be described later. In this case, the candidate derived by the SbTMVP may be used as a candidate of index 0 of the subblock merge candidate list. In other words, the candidate derived from the SbTMVP may be positioned before an inherited affine candidate or a constructed affine candidate to be described later in the subblock merge candidate list.

When the affine merge mode is applied, the affine merge candidate list may be constructed to derive CPMVs for the current block. For example, the affine merge candidate list may include at least one of the following candidates. 1) An inherited affine merge candidate. 2) Constructed affine merge candidate. 3) Zero motion vector candidate (or zero vector). Here, the inherited affine merge candidate is a candidate derived based on the CPMVs of the neighboring block when the neighboring block is coded in affine mode, the constructed affine merge candidate is a candidate derived by constructing the CPMVs based on the MVs of neighboring blocks of the corresponding CP in units of each CPMV, and the zero motion vector candidate may indicate a candidate composed of CPMVs whose value is 0.

The affine merge candidate list may be constructed as follows, for example.

There may be up to two inherited affine candidates, and the inherited affine candidates may be derived from affine motion models of neighboring blocks. Neighboring blocks can contain one left neighboring block and an upper neighboring block. The candidate blocks may be positioned as illustrated in FIG. 4. A scan order for a left predictor may be $A_1 \rightarrow A_0$, and a scan order for the upper predictor may be $B_1 \rightarrow B_0 \rightarrow B_2$. Only one inherited candidate from each of the left and top may be selected. A pruning check may not be performed between two inherited candidates.

When a neighboring affine block is identified, control point motion vectors of the checked block may be used to derive a CPMVP candidate in the affine merge list of the current block. Here, the neighboring affine block may indicate a block coded in the affine prediction mode among neighboring blocks of the current block. For example, referring to FIG. 10, when the bottom-left neighboring block A is coded in the affine prediction mode, motion vector v2, v3, and v4 at the top-left corner, the top-right corner, and bottom-left corner of the neighboring block A may be acquired. When the neighboring block A is coded with the 4-parameter affine motion model, two CPMVs of the current block may be calculated according to v2, and v4. When the neighboring block A may be calculated according to v2 and v3. When the neighboring block A is coded with the 6-parameter affine motion model, three CPMVs of the current block may be calculated according to the three CPMVs v2, v3 and v4 of the current block.

Figure 11:
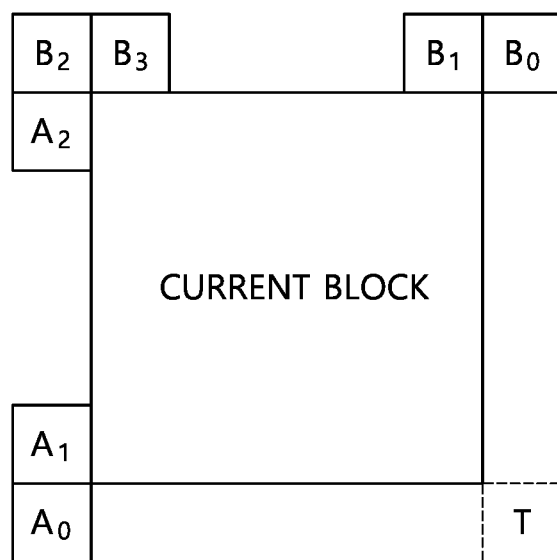
FIG. 11 is a view illustrating positions of candidates in an affine merge mode or a sub-block merge mode.

FIG. 11 is a diagram illustrating positions of candidates in the affine merge mode or the sub-block merge mode.

An affine candidate constructed in the affine merge mode or the sub-block merge mode may mean a candidate constructed by combining translational motion information around each control point. The motion information of the control points may be derived from specified spatial and temporal perimeters. CPMVk (k=0, 1, 2, 3) may represent the k-th control point.

Referring to FIG. 11, blocks may be checked in the order B2→B3→A2 for CPMV0, and a motion vector of a first available block may be used. For CPMV1, blocks may be checked according to the order of B1→B0, and for CPMV2, blocks may be checked according to the order of A1→A0. TMVP (temporal motion vector predictor) may be used with CPMV3 if available.

After motion vectors of the four control points are obtained, affine merge candidates may be generated based on the obtained motion information. A combination of control point motion vectors may be any one of {CPMV0, CPMV1, CPMV2}, {CPMV0, CPMV1, CPMV3}, {CPMV0, CPMV2, CPMV3}, {CPMV1, CPMV2, CPMV3}, {CPMV0, CPMV1}, and {CPMV0, CPMV2}.

A combination of three CPMVs may constitute a 6-parameter affine merge candidate, and a combination of two CPMVs may constitute a 4-parameter affine merge candidate. In order to avoid a motion scaling process, if the reference indices of the control points are different, the related combinations of control point motion vectors may be discarded.

Figure 12:
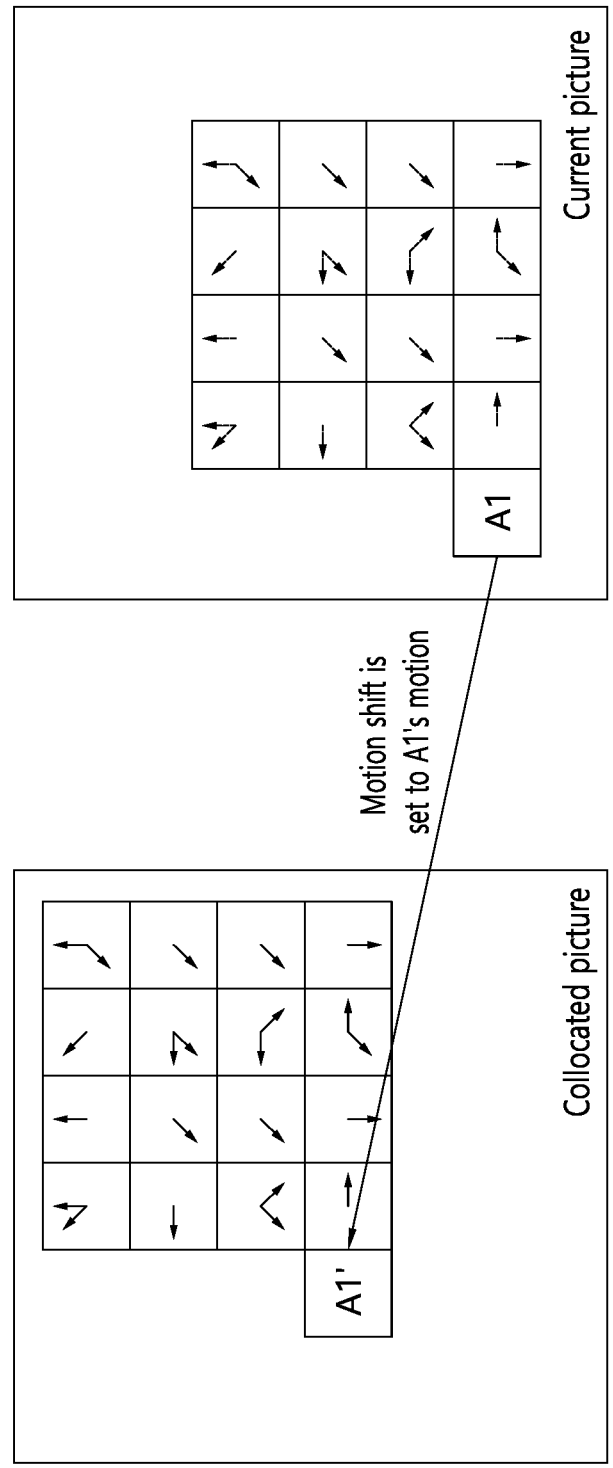
FIG. 12 is a view illustrating SbTMVP in inter prediction.

FIG. 12 is a view illustrating SbTMVP in inter prediction.

Subblock-based temporal motion vector prediction (SbTMVP) may also be referred to as advanced temporal motion vector prediction (ATMVP). SbTMVP may use a motion field in a collocated picture to improve motion vector prediction and merge mode for CUs in the current picture. Here, the collocated picture may be called a col picture.

For example, the SbTMVP may predict motion at a subblock (or sub-CU) level. In addition, the SbTMVP may apply a motion shift before fetching the temporal motion information from the col picture. Here, the motion shift may be acquired from a motion vector of one of spatially neighboring blocks of the current block.

The SbTMVP may predict the motion vector of a sub-block (or sub-CU) in the current block (or CU) according to two steps.

In the first step, spatial neighboring blocks may be tested according to the order of A1, B1, B0, and A0 of FIG. 5. A first spatial neighboring block having a motion vector using a col picture as its reference picture may be identified, and the motion vector may be selected as a motion shift to be applied. When such a motion is not identified from a spatial neighboring block, the motion shift may be set to (0, 0).

In the second step, a motion shift identified in the first step may be applied to acquire sub-block level motion information (motion vector and reference indices) from the col picture. For example, the motion shift may be added to the coordinates of the current block. For example, the motion shift may be set to a motion of A1 of FIG. 8. In this case, for each sub-block, motion information of a corresponding block in the col picture may be used to derive motion information of a sub-block. Temporal motion scaling may be applied to align reference pictures of temporal motion vectors with reference pictures of the current block.

The combined subblock-based merge list including both the SbTVMP candidate and the fine merge candidates may be used for signaling of the affine merge mode. Here, the affine merge mode may be referred to as a subblock-based merge mode. The SbTVMP mode may be available or unavailable according to a flag included in a sequence parameter set (SPS). If the SbTMVP mode is available, the SbTMVP predictor may be added as a first entry of a list of subblock-based merge candidates, and the affine merge candidates may follow. A maximum allowable size of the affine merge candidate list may be 5.

A size of a sub-CU (or subblock) used in SbTMVP may be fixed to 8×8, and like the affine merge mode, the SbTMVP mode may be applied only to blocks having both width and height of 8 or greater. An encoding logic of the additional SbTMVP merge candidate may be the same as that of other merge candidates. That is, for each CU in the P or B slice, an RD check using an additional rate-distortion (RD) cost may be performed to determine whether to use the SbTMVP candidate.

Figure 13:
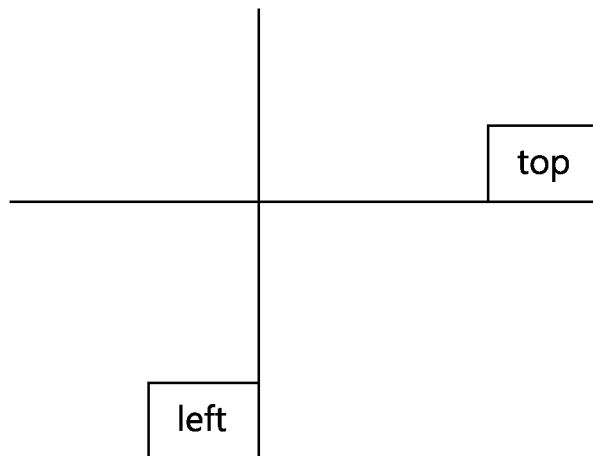
FIG. 13 is a view illustrating a combined inter-picture merge and intra-picture prediction (CIIP) mode in inter prediction.

FIG. 13 is a view illustrating a combined inter-picture merge and intra-picture prediction (CIIP) mode in inter prediction CIIP may be applied to the current CU. For example, in a case in which a CU is coded in the merge mode, the CU includes at least 64 luma samples (i.e., when the product of CU width and CU height is 64 or greater), and both CU width and CU height are less than 128 luma samples, an additional flag (e.g., ciip_flag) may then be signaled to indicate whether the CIIP mode is applied to the current CU.

In CIIP prediction, an inter prediction signal and an intra prediction signal may be combined. In the CIIP mode, an inter prediction signal P_inter may be derived using the same inter prediction process applied to the regular merge mode. An intra prediction signal P_intra may be derived according to an intra prediction process having a planar mode.

The intra prediction signal and the inter prediction signal may be combined using a weighted average, and may be expressed in Equation 4 below. The weight may be calculated according to a coding mode of the top and left neighboring blocks shown in FIG. 13.

$$P_{CIIP}=((4-wt)*P_{inter}+wt*P_{intra}+2)>>2 \quad \text{[Equation 4]}$$

In Equation 4, when the top neighboring block is available and intra-coded, isIntraTop may be set to 1, otherwise isIntraTop may be set to 0. If the left neighboring block is available and intra-coded, isIntraLeft may be set to 1, otherwise isIntraLeft may be set to 0. When (isIntraLeft+isIntraLeft) is 2, wt may be set to 3, and when (isIntraLeft+isIntraLeft) is 1, wt may be set to 2. Otherwise wt may be set to 1.

Figure 14:
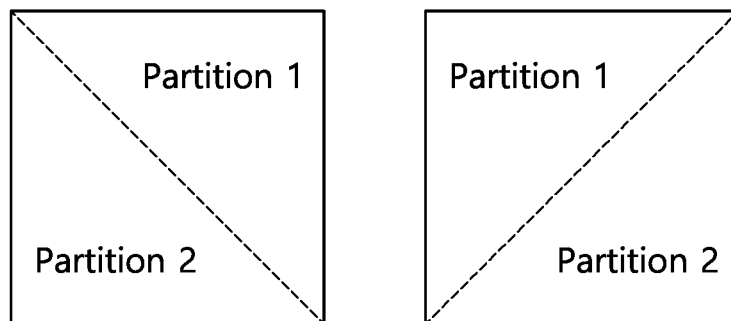
FIG. 14 is a view illustrating a partitioning mode in inter prediction.

FIG. 14 is a view illustrating a partitioning mode in inter prediction.

Referring to FIG. 14, when a partitioning mode is applied, the CU may be equally divided into two triangular-shaped partitions using diagonal split or anti-diagonal split in the opposite direction. However, this is only an example of the partitioning mode, and a CU may be equally or unevenly divided into partitions having various shapes For each partition of a CU, only unidirectional prediction may be allowed. That is, each partition may have one motion vector and one reference index. The unidirectional prediction constraint is to ensure that only two motion-compensated predictions are needed for each CU, similar to bi-prediction.

When the partitioning mode is applied, a flag indicating a split direction (a diagonal direction or an opposite diagonal direction) and two merge indices (for each partition) may be additionally signaled.

After predicting each partition, sample values based on a boundary line in a diagonal or opposite diagonal may be adjusted using blending processing with adaptive weights based on adaptive weights.

Meanwhile, when the merge mode or the skip mode is applied, motion information may be derived based on a regular merge mode, a MMVD mode (merge mode with motion vector difference), a merge subblock mode, a CIIP mode (combined inter-picture merge and intra-picture prediction mode), or a partitioning mode may be used to derive motion information to generate prediction samples as described above. Each mode may be enabled or disabled through an on/off flag in a sequence paramenter set (SPS). If the on/off flag for a specific mode is disabled in the SPS, the syntax clearly transmitted for the prediction mode in units of CUs or PUs may not be signaled.

Table 5 below relates to a process of deriving a merge mode or a skip mode from the conventional merge_data synatx. In Table 5 below, CUMergeTriangleFlag[x0][y0] may correspond to the on/off flag for the partitioning mode described above in FIG. 14, and merge_triangle_split_dir[x0][y0] may indicate a split direction (diagonal direction or opposite diagonal direction) when the partitioning mode is applied. In addition, merge_triangle_idx0[x0][y0] and merge_triangle_idx1[x0][y0] may indicate two merge indices for each partition when the partitioning mode is applied.

TABLE 5

|  | Descriptor |
|---|---|
| merge_data( x0, y0, cbWidth, cbHeight ) { |  |
|   if ( CuPredMode [ x0 ][ y0 ] = = MODE_IBC ) { |  |
|     if( MaxNumMergeCand > 1 ) |  |
|       merge_idx[ x0 ][ y0 ] | ae(v) |
|   } else { |  |
|     regular_merge_flag[ x0 ][ y0 ] | ae(v) |
|     if ( regular_merge_flag[ x0 ][ y0 ] = = 1 ) { |  |
|       if( MaxNumMergeCand > 1 ) |  |
|         merge_idx[ x0 ][ y0 ] | ae(v) |
|     } else { |  |
|       if( sps_mmvd_enabled_flag && cbWidth * cbHeight != 32 ) |  |
|         mmvd_flag[ x0 ][ y0 ] | ae(v) |
|       if( mmvd_flag[ x0 ][ y0 ] = = 1 ) { |  |
|         if( MaxNumMergeCand > 1 ) |  |
|           mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { |  |
|         if( MaxNumSubblockMergeCand > 0 && cbWidth >= 8 && cbHeight >= 8 ) |  |
|           merge_subblock_flag[ x0 ][ y0 ] | ae(v) |
|         if( merge_subblock_flag[ x0 ][ y0 ] = = 1 ) { |  |
|           if( MaxNumSubblockMergeCand > 1 ) |  |
|             merge_subblock_idx[ x0 ][ y0 ] | ae(v) |
|         } else { |  |
|           if( sps_ciip_enabled_flag && cu_skip_flag[ x0 ][ y0 ] = = 0 && |  |
|             ( cbWidth * cbHeight) >= 64 && cbWidth < 128 && cbHeight < 128 ) |  |
|           { |  |

TABLE 5-continued

| | Descriptor |
|---|---|
| ciip_flag[ x0 ][ y0 ] | ae(v) |
| if( ciip_flag[ x0 ][ y0 ] && MaxNumMergeCand > 1 ) | |
|    merge_idx[ x0 ][ y0 ] | ae(v) |
| } | |
| if( CUMergeTriangleFlag[ x0 ][ y0 ] ) { | |
|    merge_triangle_split_dir[ x0 ][ y0 ] | ae(v) |
|    merge_triangle_idx0[ x0 ][ y0 ] | ae(v) |
|    merge_triangle_idx1[ x0 ][ y0 ] | ae(v) |
|   } | |
|  } | |
| } | |
| } | |
| } | |

Meanwhile, each prediction mode including regular merge mode, MMVD mode, merge subblock mode, CIIP mode and partitioning mode may be enabled or disabled from sequence paramenter set (SPS) as shown in Table 6 below. In Table 6 below, sps_triangle_enabled_flag may correspond to a flag that enables or disables the partitioning mode described above in FIG. 14 from the SPS.

TABLE 6

| | Descriptor |
|---|---|
| seq_parameter_set_rbsp( ) { | |
|   sps_decoding_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |

TABLE 6-continued

|  | Descriptor |
|---|---|
| } | |
| } | |
| sps_sao_enabled_flag | u(1) |
| sps_alf_enabled_flag | u(1) |
| sps_pcm_enabled_flag | u(1) |
| if( sps_pcm_enabled_flag ) { | |
|   pcm_sample_bit_depth_luma_minus1 | u(4) |
|   pcm_sample_bit_depth_chroma_minus1 | u(4) |
|   log2_min_pcm_luma_coding_block_size_minus3 | ue(v) |
|   log2_diff_max_min_pcm_luma_coding_block_size | ue(v) |
|   pcm_loop_filter_disabled_flag | u(1) |
| } | |
| if( ( CtbSizeY / MinCbSizeY + 1 ) <= ( pic_width_in_luma_samples / MinCbSizeY − 1 ) ) { | |
|   sps_ref_wraparound_enabled_flag | u(1) |
|   if( sps_ref_wraparound_enabled_flag ) | |
|     sps_ref_wraparound_offset_minus1 | ue(v) |
| } | |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_affine_amvr_enabled_flag | u(1) |
| sps_dmvr_enabled_flag | u(1) |
| sps_mmvd_enabled_flag | u(1) |
| sps_cclm_enabled_flag | u(1) |
| if( sps_cclm_enabled_flag && chroma_format_idc = 1 ) | |
|   sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| sps_affine_enabled_flag | u(1) |
| if( sps_affine_enabled_flag ) | |
|   sps_affine_type_flag | u(1) |
| sps_gbi_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_triangle_enabled_flag | u(1) |
| sps_lmcs_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

The merge_data syntax of Table 5 may be parsed or derived according to a flag of the SPS of Table 6 and a condition in which each prediction mode may be used. Summarizing all cases according to the conditions under which the flag of the SPS and each prediction mode may be used are shown in Tables 7 and 8. Table 7 shows the number of cases in which the current block is in the merge mode, and Table 8 shows the number of cases in which the current block is in the skip mode. In Tables 7 and 8 below, regular may correspond to the regular merge mode, mmvd may correspond to Triangle, or TRI may correspond to the partitioning mode described above with reference to FIG. 12.

TABLE 7

| SKIP SPS | | | | 4 × 8/8 × 4 CU | | | | |
|---|---|---|---|---|---|---|---|---|
| mmvd | subBlock | CIIP | Triangle | regular | mmvd | subBlock | CIIP | FALL-BACK |
| 0 | 0 | 0 | 0 | x | x | x | x | REG |
| 0 | 0 | 0 | 1 | x | x | x | x | REG |
| 0 | 0 | 1 | 0 | x | x | x | x | REG |
| 0 | 0 | 1 | 1 | x | x | x | x | REG |
| 0 | 1 | 0 | 0 | x | x | x | x | REG |
| 0 | 1 | 0 | 1 | x | x | x | x | REG |
| 0 | 1 | 1 | 0 | x | x | x | x | REG |
| 0 | 1 | 1 | 1 | x | x | x | x | REG |
| 1 | 0 | 0 | 0 | o | x | x | x | MMVD |
| 1 | 0 | 0 | 1 | o | x | x | x | MMVD |
| 1 | 0 | 1 | 0 | o | x | x | x | MMVD |
| 1 | 0 | 1 | 1 | o | x | x | x | MMVD |
| 1 | 1 | 0 | 0 | o | x | x | x | MMVD |
| 1 | 1 | 0 | 1 | o | x | x | x | MMVD |
| 1 | 1 | 1 | 0 | o | x | x | x | MMVD |
| 1 | 1 | 1 | 1 | o | x | x | x | MMVD |

| 4 × N/N × 4 CU | | | | | 8 × 8~ CU | | | | |
|---|---|---|---|---|---|---|---|---|---|
| regular | mmvd | subBlock | CIIP | FALL-BACK | regular | mmvd | subBlock | CIIP | FALL-BACK |
| x | x | x | x | REG | x | x | x | x | REG |
| o | x | x | x | TRI | o | x | x | x | TRI |
| o | x | x | x | CIIP | o | x | x | x | CIIP |
| o | x | x | o | TRI | o | x | x | o | TRI |
| x | x | x | x | REG | o | x | x | x | SUB |
| o | x | x | x | TRI | o | x | x | x | TRI |
| o | x | x | x | CIIP | o | x | x | o | CIIP |
| o | x | x | o | TRI | o | x | x | o | TRI |
| o | x | x | x | MMVD | o | x | x | x | MMVD |
| o | o | x | x | TRI | o | o | x | x | TRI |
| o | o | x | x | CIIP | o | o | x | o | CIIP |
| o | o | x | o | TRI | o | o | x | o | TRI |
| o | x | x | x | MMVD | o | o | x | x | SUB |
| o | o | x | x | TRI | o | o | o | x | TRI |
| o | o | x | x | CIIP | o | o | o | x | CIIP |
| o | o | x | o | TRI | o | o | o | o | TRI |

TABLE 8

| SKIP SPS | | | | 4 × 8/8 × 4 CU | | | |
|---|---|---|---|---|---|---|---|
| mmvd | subBlock | CIIP | Triangle | regular | mmvd | subBlock | FALL-BACK |
| 0 | 0 | 0 | 0 | x | x | x | REG |
| 0 | 0 | 0 | 1 | x | x | x | REG |
| 0 | 0 | 1 | 0 | x | x | x | REG |
| 0 | 0 | 1 | 1 | x | x | x | REG |
| 0 | 1 | 0 | 0 | x | x | x | REG |
| 0 | 1 | 0 | 1 | x | x | x | REG |
| 0 | 1 | 1 | 0 | x | x | x | REG |
| 0 | 1 | 1 | 1 | x | x | x | REG |
| 1 | 0 | 0 | 0 | o | x | x | MMVD |
| 1 | 0 | 0 | 1 | o | x | x | MMVD |
| 1 | 0 | 1 | 0 | o | x | x | MMVD |
| 1 | 0 | 1 | 1 | o | x | x | MMVD |
| 1 | 1 | 0 | 0 | o | x | x | MMVD |
| 1 | 1 | 0 | 1 | o | x | x | MMVD |
| 1 | 1 | 1 | 0 | o | x | x | MMVD |
| 1 | 1 | 1 | 1 | o | x | x | MMVD |

TABLE 8-continued

| 4 × N/N × 4 CU |  |  |  | 8 × 8 CU |  |  |  |
|---|---|---|---|---|---|---|---|
| regular | mmvd | subBlock | FALL-BACK | regular | mmvd | subBlock | FALL-BACK |
| X | X | X | REG | X | X | X | REG |
| O | X | X | TRI | O | X | X | TRI |
| X | X | X | REG | X | X | X | REG |
| O | X | X | TRI | O | X | X | TRI |
| X | X | X | REG | O | X | X | SUB |
| O | X | X | TRI | O | X | X | TRI |
| X | X | X | REG | O | X | X | SUB |
| O | X | X | TRI | O | X | O | TRI |
| O | X | X | MMVD | O | X | X | MMVD |
| O | O | X | TRI | O | O | X | TRI |
| O | X | X | MMVD | O | X | X | MMVD |
| O | O | X | TRI | O | O | X | TRI |
| O | X | X | MMVD | O | O | X | SUB |
| O | O | X | TRI | O | O | O | TRI |
| O | X | X | MMVD | O | O | X | SUB |
| O | O | X | TRI | O | O | O | TRI |

As one example of the cases mentioned in Tables 7 and 8, a case in which the current block is 4×16 and the skip mode is described. When merge subblock mode, MMVD mode, CIIP mode, and partitioning mode are all enabled in SPS, if regular_merge_flag[x0][y0], mmvd_flag[x0][y0] and merge_subblock_flag[x0][y0] in the merge_data syntax] are all 0, motion information for the current block should be derived in the partitioning mode. However, even if the partitioning mode is enabled from the on/off flag in the SPS, it may be used as the prediction mode only when the conditions of Table 9 below are additionally satisfied. In Table 9 below, MergeTriangleFlag[x0][y0] may correspond to an on/off flag for the partitioning mode, and sps_triangle_enabled_flag may correspond to a flag enabling or disabling the partitioning mode from the SPS.

TABLE 9

- If all the following conditions are true, MergeTriangleFlag[ x0 ][ y0 ] is set equal to 1:
  - sps_triangle_enabled_flag is equal to 1.
  - slice_type is equal to B
  - merge_flag[ x0 ][ y0 ] is equla to 1
  - MaxNumTriangleMergeCand is larger than or equal to 2
  - cbWidth * cbHeight is larger than or equal to 64
  - regular_merge_flag[ x0 ][ y0 ] is equal to 0
  - mmvd_flag[ x0 ][ y0 ] is equal to 0
  - merge_subblock_flag[ x0 ][ y0 ] is equal to 0
  - mh_intra_flag[ x0 ][ y0 ] is equal to 0
- Otherwise, MergeTriangleFlag[ x0 ][ y0 ] is set equal to 0.

Referring to Table 9 above, if the current slice is P slice, since prediction samples cannot be generated through the partitioning mode, the decoder may be unable to decode a bitstream any more. As such, in order to solve a problem that occurs in an exceptional case in which decoding is not performed because a final prediction mode cannot be selected according to each on/off flag of the SPS and the merge data syntax, in the present disclosure, a default merge mode is suggested. The default merge mode may be pre-defined in various ways or may be derived through additional syntax signaling.

In an embodiment, the regular merge mode may be applied to the current block based on a case in which the MMVD mode, the merge subblock mode, the CIIP mode, and the partitioning mode for performing prediction by dividing the current block into two partitions are all not available. That is, when the merge mode cannot be finally selected for the current block, the regular merge mode may be applied as a default merge mode.

For example, if a value of the general merge flag indicating whether the merge mode is available for the current block is 1, but the merge mode cannot be finally selected for the current block, the regular merge mode may be applied as a default merge mode.

In this case, motion information of the current block may be derived based on merge index information indicating one of the merge candidates included in a merge candidate list of the current block, and prediction samples may be generated based on the derived motion information.

Accordingly, the merge data syntax may be as shown in Table 10 below.

TABLE 10

|  | Descriptor |
|---|---|
| merge_data( x0, y0, cbWidth, cbHeight ) { |  |
|   if ( CuPredMode[ x0 ][ y0 ] = = MODE_IBC ) { |  |
|     if( MaxNumMergeCand > 1 ) |  |
|       merge_idx[ x0 ][ y0 ] | ae(v) |
|   } else { |  |
|     if( sps_mmvd_enabled_flag ‖ cbWidth * cbHeight != 32 ) |  |
|       regular_merge_flag[ x0 ][ y0 ] | ae(v) |
|     if ( regular_merge_flag[ x0 ][ y0 ] = = 1 ){ |  |
|       if( MaxNumMergeCand > 1 ) |  |
|         merge_idx[ x0 ][ y0 ] | ae(v) |
|     } else { |  |
|       if( sps_mmvd_enabled_flag && cbWidth * cbHeight != 32 ) |  |

TABLE 10-continued

| | Descriptor |
|---|---|
|     mmvd_merge_flag[ x0 ][ y0 ] | ae(v) |
|     if( mmvd_merge_flag[ x0 ][ y0 ] = = 1 ) { | |
|       if( MaxNumMergeCand > 1 ) | |
|         mmvd_cand_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >= 8 ) | |
|       if( MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] = = 1 ) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && cu_skip_flag[ x0 ][ y0 ] = = 0 && ( cbWidth * cbHeight) >= 64 && cbWidth < 128 && cbHeight < 128 ) { | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         } | |
|         if( MergeTriangleFlag[ x0 ][ y0 ] ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|         if( !ciip_flag[x0][y0] && !MergeTriangleFlag[x0][y0]) { | |
|           if( MaxNumMergeCand > 1 ) | |
|             merge_idx[ x0 ][ y0 ] | |
|         } | |
|       } | |
|     } | |
|   } | |
| } | |

Referring to Table 10 and Table 6, based on a case in which the MMVD mode is not available, a flag sps_mmvd_enabled_flag for enabling or disabling the MMVD mode from the SPS may be 0 or a first flag (mmvd_merge_flag[x0][y0]) indicating whether or not the MMVD mode is applied may be 0.

In addition, based on a case in which the merge subblock mode is not available, a flag sps_affine_enabled_flag for enabling or disabling the merge subblock mode from the SPS may be 0 or a second flag (merge_subblock_flag[x0][y0]) indicating whether the merge subblock mode is applied may be 0.

In addition, based on a case in which the CIIP mode is not available, a flag sps_ciip_enabled_flag for enabling or disabling the CIIP mode from the SPS may be 0 or a third flag (ciip_flag[x0][y0]) indicating whether the CIIP mode is applied may be 0.

In addition, based on a case in which the partitioning mode is not available, a flag sps_triangle_enabled_flag for enabling or disabling the partitioning mode from the SPS may be 0 or a fourth flag (MergeTriangleFlag[x0][y0]) indicating whether the partitioning mode is applied may be 0.

Also, for example, based on a case in which the partitioning mode is disabled based on the flag sps_triangle_enabled_flag, the fourth flag (MergeTriangleFlag[x0][y0]) indicating whether the partitioning mode is applied may be set to 0.

In another embodiment, based on that the regular merge mode, the MMVD mode, the merge subblock mode, the CIIP mode, and the partitioning mode for performing prediction by dividing the current block into two partitions, the regular merge mode may be applied to the current block. That is, when the merge mode cannot be finally selected for the current block, the regular merge mode may be applied as a default merge mode.

For example, in a case in which a value of the general merge flag indicating whether the merge mode is available for the current block is 1 but the merge mode cannot be finally selected for the current block, the regular merge mode may be applied as a default merge mode.

For example, based on a case in which the MMVD mode is not available, a flag sps_mmvd_enabled_flag for enabling or disabling the MMVD mode from the SPS may be 0 or a first flag (mmvd_merge_flag[x0][y0]) indicating whether the MMVD mode is applied may be 0.

In addition, based on a case in which the merge subblock mode is not available, a flag sps_affine_enabled_flag for enabling or disabling the merge subblock mode from the SPS may be 0 or the second flag (merge_subblock_flag[x0][y0]) indicating whether the merge subblock mode is applied may be 0.

In addition, based on a case in which the CIIP mode is not available, a flag sps_ciip_enabled_flag for enabling or disabling the CIIP mode from the SPS may be 0 or a third flag (ciip_flag[x0][y0]) indicating whether the CIIP mode is applied may be 0.

In addition, based on a case in which the partitioning mode is not available, a flag sps_triangle_enabled_flag for enabling or disabling the partitioning mode from the SPS may be 0 or a fourth flag (MergeTriangleFlag[x0][y0]) indicating whether the partitioning mode is applied may be 0.

Also, based on a case in which the regular merge mode is not available, a fifth flag (regular_merge_flag[x0][y0]) indicating whether the regular merge mode is applied may be 0. That is, even when the value of the fifth flag is 0, the regular merge mode may be applied to the current block based on a case in which the MMVD mode, the merge subblock mode, the CIIP mode, and the partitioning mode are not available.

In this case, motion information of the current block may be derived based on a first candidate among merge candidates included in the merge candidate list of the current block, and prediction samples may be generated based on the derived motion information.

In another embodiment, the regular merge mode may be applied to the current block based on that the regular merge mode, the MMVD mode, the merge subblock mode, the CIIP mode, and the partitioning mode for performing prediction by dividing the current block into two partitions are not available. That is, when a merge mode is finally selected for the current block, the regular merge mode may be applied as a default merge mode.

For example, in a case in which the value of the general merge flag indicating whether the merge mode is available for the current block is 1 but a merge mode is not finally selected for the current block, the regular merge mode may be applied as a default merge mode.

For example, based on a case in which the MMVD mode is not available, a flag sps_mmvd_enabled_flag for enabling or disabling the MMVD mode from the SPS may be 0 or a first flag (mmvd_merge_flag[x0][y0]) indicating whether the MMVD mode is applied may be 0.

In addition, based on a case in which the merge subblock mode is not available, the flag sps_affine_enabled_flag for enabling or disabling the merge subblock mode from the SPS may be 0 or the second flag (merge_subblock_flag[x0][y0]) indicating whether the merge subblock mode is applied may be 0.

In addition, based on a case in which the CIIP mode is not available, a flag sps_ciip_enabled_flag for enabling or disabling the CIIP mode from the SPS may be 0 or a third flag (ciip_flag[x0][y0]) indicating whether the CIIP mode is applied may be 0.

In addition, based on a case in which the partitioning mode is not available, a flag sps_triangle_enabled_flag for enabling or disabling the partitioning mode from the SPS may be 0 or a fourth flag (MergeTriangleFlag[x0][y0]) indicating whether the partitioning mode is applied may be 0.

Also, based on a case in which the regular merge mode is not available, a fifth flag (regular_merge_flag[x0][y0]) indicating whether the regular merge mode is applied may be 0. That is, even when the value of the fifth flag is 0, the regular merge mode may be applied to the current block based on a case in which the MMVD mode, the merge subblock mode, the CIIP mode, and the partitioning mode are not available.

In this case, a (0, 0) motion vector may be derived as motion information of the current block, and prediction samples of the current block may be generated based on the (0, 0) motion information. For the (0, 0) motion vector, prediction may be performed with reference to a 0th reference picture of an L0 reference list. However, when the 0th reference picture (RefPicList[0][0]) of the L0 reference list does not exist, prediction may be performed by referring to a 0th reference picture (RefPicList[1][0]) of an L1 reference list.

Figure 15:
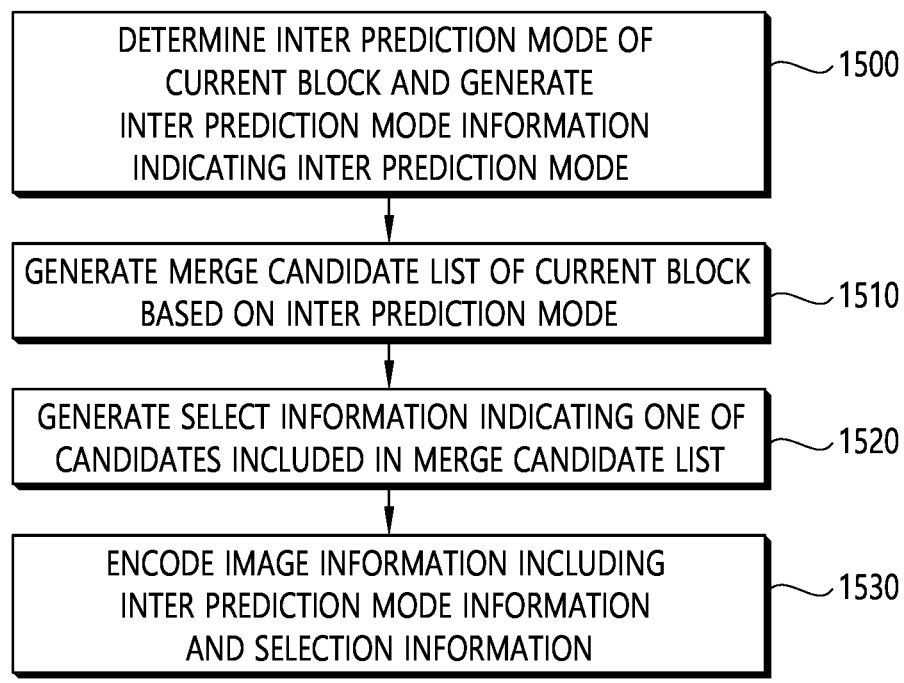
FIGS. 15 and 16 schematically show an example of a video/image encoding method and related components according to embodiment(s) of the present disclosure.
Figure 16:
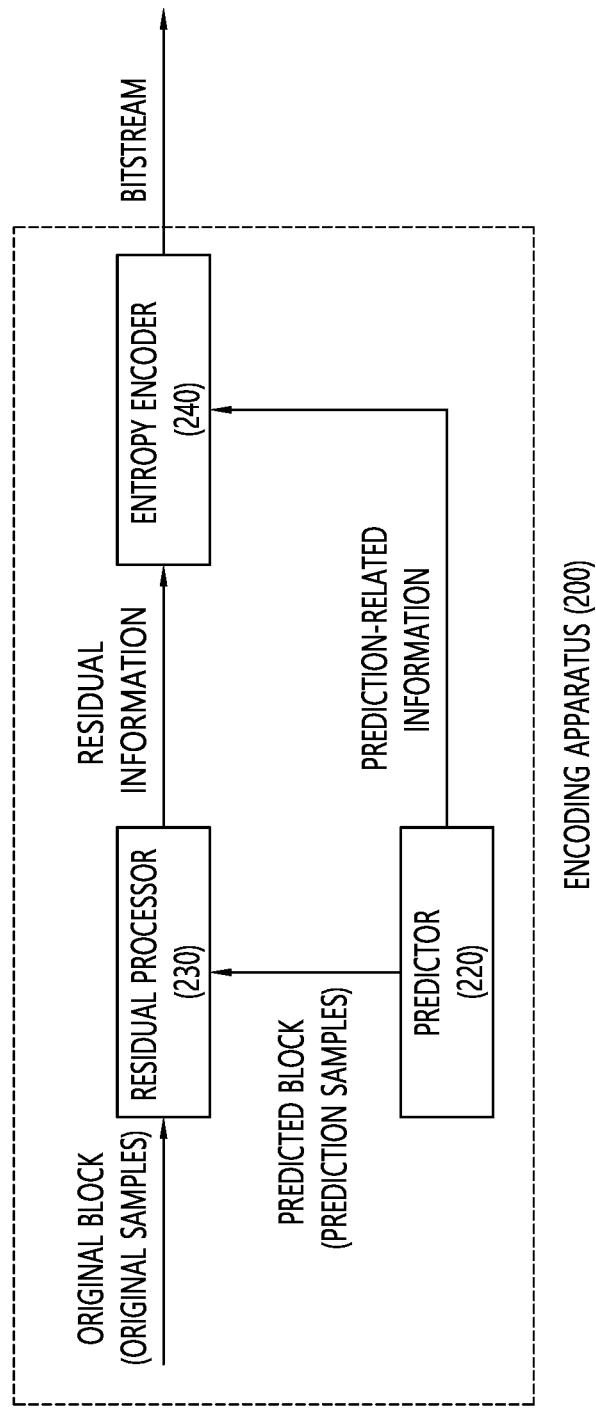

FIGS. 15 and 16 schematically show an example of a video/image encoding method and related components according to embodiment(s) of this document.

The method disclosed in FIG. 15 may be performed by the encoding apparatus disclosed in FIG. 2 or FIG. 16. Specifically, for example, steps S1500 to S1520 of FIG. 15 may be performed by the predictor 220 of the encoding apparatus 200 of FIG. 16, and S1530 of FIG. 15 may be performed by the entropy encoder 240 of the encoding apparatus 200 of FIG. 16. In addition, although not shown in FIG. 15, prediction samples or prediction related information may be derived by the predictor 220 of the encoding apparatus 200 in FIG. 15, and residual information may be derived from the original samples or prediction samples by the residual processor 230 of the encoding apparatus 200, and a bitstream may be generated from the residual information or prediction-related information by the entropy encoder 240 of the encoding apparatus 200. The method disclosed in FIG. 15 may include the embodiments described above in this document.

Referring to FIG. 15, the encoding apparatus may determine an inter prediction mode of the current block and generate inter prediction mode information indicating the inter prediction mode (S1700). For example, the encoding apparatus may determine at least one of a regular merge mode, a skip mode, a motion vector prediction (MVP) mode, a merge mode with motion vector difference (MMVD), a merge subblock mode, a CIIP mode (combined inter-picture merge and intra-picture prediction mode), and a partitioning mode that performs prediction by dividing the current block into two partitions, as an inter prediction mode to be applied to the current block and generate inter prediction mode information indicating the inter prediction mode.

The encoding apparatus may generate a merge candidate list of the current block based on the inter prediction mode (S1510). For example, the encoding apparatus may generate a merge candidate list according to the determined inter prediction mode.

For example, candidates may be inserted into the merge candidate list until the number of candidates in the merge candidate list is a maximum number of candidates. Here, the candidate may indicate a candidate or a candidate block for deriving motion information (or motion vector) of the current block. For example, the candidate block may be derived by searching for neighboring blocks of the current block. For example, the neighboring block may include a spatial neighboring block and/or a temporal neighboring block of the current block, and a spatial neighboring block may be searched preferentially (spatial merge) to derive a candidate, and then the temporal neighboring block may be searched and derived as a (temporal merge) candidate, and the derived candidates may be inserted into the merge candidate list. For example, when the number of candidates in the merge candidate list is less than the maximum number of candidates in the merge candidate list even after the candidates are inserted, an additional candidate may be inserted. For example, the additional candidate may include at least one of history based merge candidate(s), pair-wise average merge candidate(s), ATMVP, and combined bi-predictive merge candidates (when the slice/tile group type of the current slice/tile group is type B)) and/or a zero vector merge candidate.

The encoding apparatus may generate selection information indicating one of candidates included in the merge candidate list (S1520). As described above, the merge candidate list may include at least some of a spatial merge candidate, a temporal merge candidate, a pairwise candidate, or a zero vector candidate, and one of these candidates may be selected for inter prediction of the current block.

For example, the selection information may include index information indicating one candidate among merge candidates included in the merge candidate list. For example, the selection information may be referred to as merge index information.

For example, the encoding apparatus may generate prediction samples of the current block based on the candidate indicated by the merge index information. Alternatively, for example, the encoding apparatus may derive motion information based on the candidate indicated by the merge index information, and may generate prediction samples of the current block based on the motion information.

At this time, based on that the MMVD mode (merge mode with motion vector difference), the merge subblock mode, the CIIP mode (combined inter-picture merge and intra-picture prediction mode), and the partitioning mode for performing prediction by dividing the current block into partitions are not available, the regular merge mode may be applied to the current block. Here, the merge candidate list may be generated by applying the regular merge mode to the current block.

For example, the inter prediction mode information may include merge index information indicating one of the merge candidates included in the merge candidate list of the current block, and motion information of the current block may be derived based on the candidate indicated by the merge index information. Also, prediction samples of the current block may be generated based on the derived motion information.

For example, the inter prediction mode information may include a first flag indicating whether the MMVD mode is applied, a second flag indicating whether the merge subblock mode is applied, and a third flag indicating whether the CIIP mode is applied.

For example, based on a case in which the MMVD mode, the merge subblock mode, the CIIP mode, and the partitioning mode are not available, the values of the first flag, the second flag, and the third flag may all be 0

Also, for example, the inter prediction mode information may include a general merge flag indicating whether a merge mode is available for the current block, and a value of the general merge flag may be 1.

For example, a flag for enabling or disabling the partitioning mode may be included in a sequence parameter set (SPS) of the image information, and based on a case in which the partitioning mode is disabled, the value of the fourth flag indicating whether the partitioning mode is applied may be set to 0.

Meanwhile, the inter prediction mode information may further include a fifth flag indicating whether the regular merge mode is applied. Even when the value of the fifth flag is 0, the regular merge mode may be applied to the current block based on a case in which the MMVD mode, the merge subblock mode, the CIIP mode, and the partitioning mode are not available.

In this case, the motion information of the current block may be derived based on a first merge candidate among merge candidates included in the merge candidate list of the current block. Also, the prediction samples may be generated based on the motion information of the current block derived based on the first merge candidate.

Alternatively, in this case, the motion information of the current block may be derived based on the (0,0) motion vector, and the prediction samples may be generated based on the motion information of the current block derived based on the (0,0) motion vector.

The encoding apparatus may encode image information including inter prediction mode information and selection information (S1530). For example, the image information may be referred to as video information. The image information may include various information according to the embodiment(s) of the present disclosure described above. For example, the image information may include at least some of prediction-related information or residual-related information. For example, the prediction-related information may include at least some of the inter prediction mode information, selection information, and inter prediction type information. For example, the encoding apparatus may encode image information including all or part of the aforementioned information (or syntax elements) to generate a bit stream or encoded information. Or, the encoding apparatus may output the information in the form of a bitstream. In addition, the bitstream or encoded information may be transmitted to the decoding apparatus through a network or a storage medium.

Alternatively, although not shown in FIG. 15, for example, the encoding apparatus may derive residual samples based on the prediction samples and the original samples. In this case, residual-related information may be derived based on the residual samples. Residual samples may be derived based on the residual-related information. Reconstructed samples may be generated based on the residual samples and the prediction samples. A reconstructed block and a reconstructed picture may be derived based on the reconstructed samples. Alternatively, for example, the encoding apparatus may encode image information including residual information or prediction-related information For example, the encoding apparatus may generate a bitstream or encoded information by encoding image information including all or part of the aforementioned information (or syntax elements). Alternatively, the encoding apparatus may be output the information in the form of a bitstream. In addition, the bitstream or encoded information may be transmitted to the decoding apparatus through a network or a storage medium. Alternatively, the bitstream or the encoded information may be stored in a computer-readable storage medium, and the bitstream or the encoded information may be generated by the aforementioned image encoding method.

Figure 17:
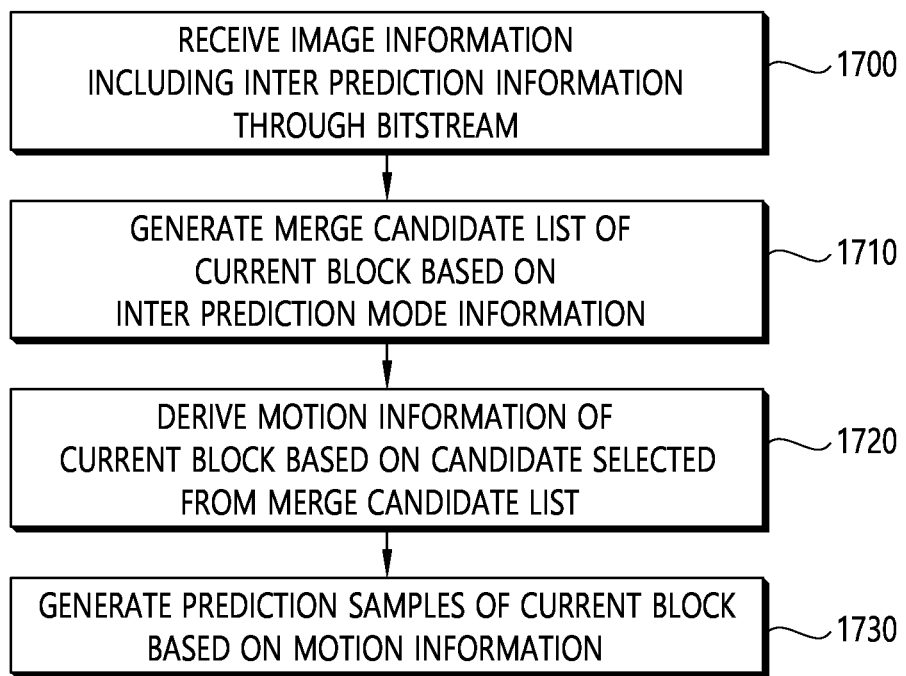
FIGS. 17 and 18 schematically show an example of an video/image decoding method and related components according to embodiment(s) of the present disclosure.
Figure 18:
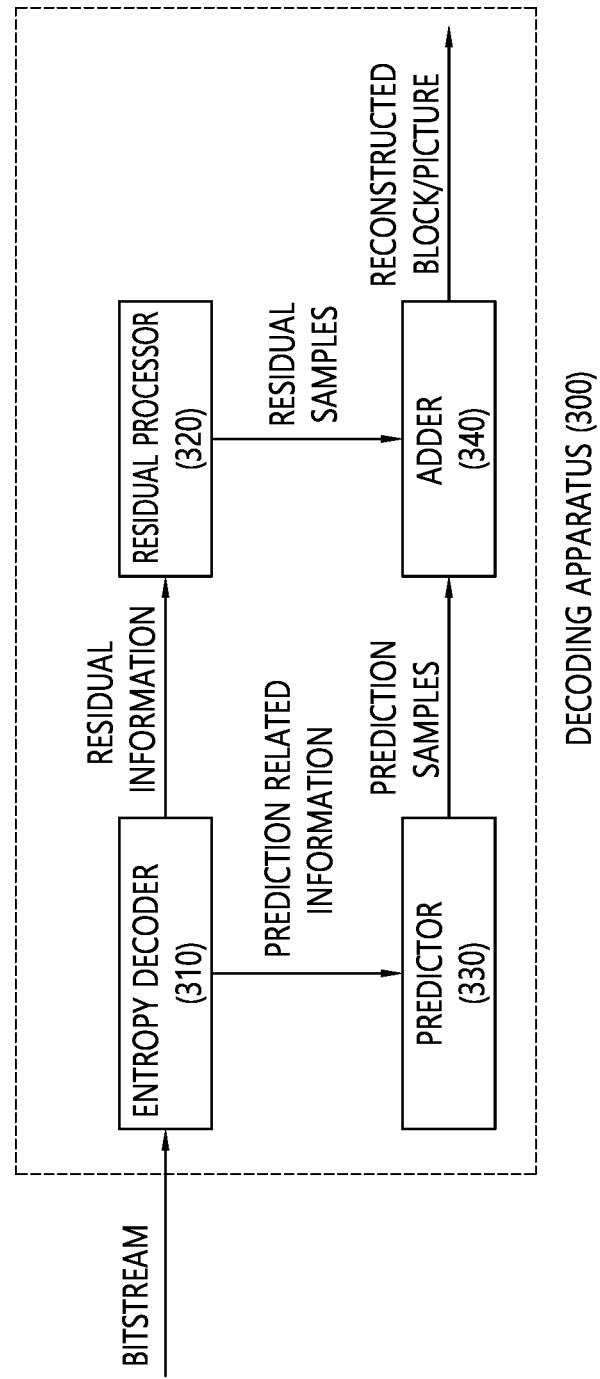

FIGS. 17 and 18 schematically show an example of a video/image decoding method and related components according to embodiment(s) of the present disclosure.

The method disclosed in FIG. 17 may be performed by the decoding apparatus disclosed in FIG. 3 or FIG. 18. Specifically, for example, step S1700 of FIG. 17 may be performed by the entropy decoder 310 of the decoding apparatus 300 in FIG. 1, and steps S1710 to S1730 of FIG. 17 may be performed by the predictor 330 of the the decoding apparatus 300 in FIG. 18.f In addition, although not shown in FIG. 17, prediction-related information or residual information may be derived from a bitstream by the entropy decoder 310 of the decoding apparatus 300 in FIG. 18. The method disclosed in FIG. 17 may include the embodiments described above in this document.

Referring to FIG. 17, the decoding apparatus may receive image information including inter prediction mode information through a bitstream (S1700). For example, the image information may be referred to as video information. The image information may include various information according to the aforementioned embodiment(s) of the present disclosure. For example, the image information may include at least a part of prediction-related information or residual-related information.

For example, the prediction-related information may include inter prediction mode information or inter prediction type information. For example, the inter prediction mode information may include information indicating at least some of various inter prediction modes. For example, various modes such as a regular merge mode, a skip mode, an MVP (motion vector prediction) mode, an MMVD mode (merge mode with motion vector difference), a merge subblock mode, a CIIP mode (combined inter-picture merge and intra-picture prediction mode) and a partitioning mode performing prediction by dividing the current block into two partitions may be used. For example, the inter prediction type information may include an inter_pred_idc syntax element. Alternatively, the inter prediction type information may include information indicating any one of L0 prediction, L1 prediction, and bi-prediction.

The decoding apparatus may generate a merge candidate list of the current block based on the inter prediction mode information (S1710). For example, the decoding apparatus may generate a merge candidate list according to a determined inter prediction mode among the regular merge mode, the skip mode, the MVP mode, the MMVD mode, the merge subblock mode, the CIIP mode, and the partitioning mode performing prediction by dividing the current block into two partitions, as an inter prediction mode of the current block based on the inter prediction mode information For example, candidates may be inserted into the merge candidate list until the number of candidates in the merge candidate list is a maximum number of candidates. Here, the candidate may indicate a candidate or a candidate block for deriving motion information (or motion vector) of the current block. For example, the candidate block may be derived by searching for neighboring blocks of the current block. For example, the neighboring block may include a spatial neighboring block and/or a temporal neighboring block of the current block, and a spatial neighboring block may be searched preferentially (spatial merge) to derive a candidate, and then the temporal neighboring block may be searched and derived as a (temporal merge) candidate, and the derived candidates may be inserted into the merge candidate list. For example, when the number of candidates in the merge candidate list is less than the maximum number of candidates in the merge candidate list even after the candidates are inserted, an additional candidate may be inserted. For example, the additional candidate may include at least one of history based merge candidate(s), pair-wise average merge candidate(s), ATMVP, and combined bi-predictive merge candidates (when the slice/tile group type of the current slice/tile group is type B)) and/or a zero vector merge candidate.

The decoding apparatus may derive motion information of the current block based on a candidate selected from the merge candidate list (S1720).

As described above, the merge candidate list may include at least some of a spatial merge candidate, a temporal merge candidate, a pairwise candidate, or a zero vector candidate, and one of these candidates may be selected for inter prediction of the current block.

For example, the selection information may include index information indicating one candidate among merge candidates included in the merge candidate list. For example, the selection information may be referred to as merge index information.

The decoding apparatus may generate prediction samples of the current block based on the motion information (S1730). For example, the decoding apparatus may generate prediction samples of the current block based on the candidate indicated by the merge index information. Alternatively, for example, the decoding apparatus may derive motion information based on the candidate indicated by the merge index information, and may generate prediction samples of the current block based on the motion information.

Meanwhile, according to an embodiment, based on that the merge mode with motion vector difference (MMVD) mode, the merge subblock mode, the combined inter-picture merge and intra-picture prediction (CIIP) mode, and the partitioning mode for performing prediction by dividing the current block into two partitions are not available, the regular merge mode may be applied to the current block. Here, the merge candidate list may be generated by applying the regular merge mode to the current block.

For example, the inter prediction mode information may include merge index information indicating one of the merge candidates included in the merge candidate list of the current block, and motion information of the current block may be derived based on the candidate indicated by the merge index information. Also, prediction samples of the current block may be generated based on the derived motion information For example, the inter prediction mode information may include a first flag indicating whether the MMVD mode is applied, a second flag indicating whether the merge subblock mode is applied, and a third flag indicating whether the CIIP mode is applied.

For example, based on a case in which the MMVD mode, the merge subblock mode, the CIIP mode, and the partitioning mode are not available, the values of the first flag, the second flag, and the third flag may all be 0.

Also, for example, the inter prediction mode information may include a general merge flag indicating whether a merge mode is available for the current block, and the value of the general merge flag may be 1.

For example, a flag for enabling or disabling the partitioning mode may be included in a sequence parameter set (SPS) of the image information, and based on a case in which the partitioning mode is disabled, the value of the fourth flag indicating whether the partitioning mode is applied may be set to 0.

Meanwhile, the inter prediction mode information may further include a fifth flag indicating whether the regular merge mode is applied. Even when the value of the fifth flag is 0, the regular merge mode may be applied to the current block based on a case in which the MMVD mode, the merge subblock mode, the CIIP mode, and the partitioning mode are not available.

In this case, the motion information of the current block may be derived based on a first merge candidate among merge candidates included in the merge candidate list of the current block. Also, the prediction samples may be generated based on the motion information of the current block derived based on the first merge candidate.

Alternatively, in this case, the motion information of the current block may be derived based on the (0,0) motion vector, and the prediction samples may be generated based on the motion information of the current block derived based on the (0,0) motion vector.

Although not shown in FIG. 17, for example, the decoding apparatus may derive residual samples based on residual-related information included in the image information.

For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 19:
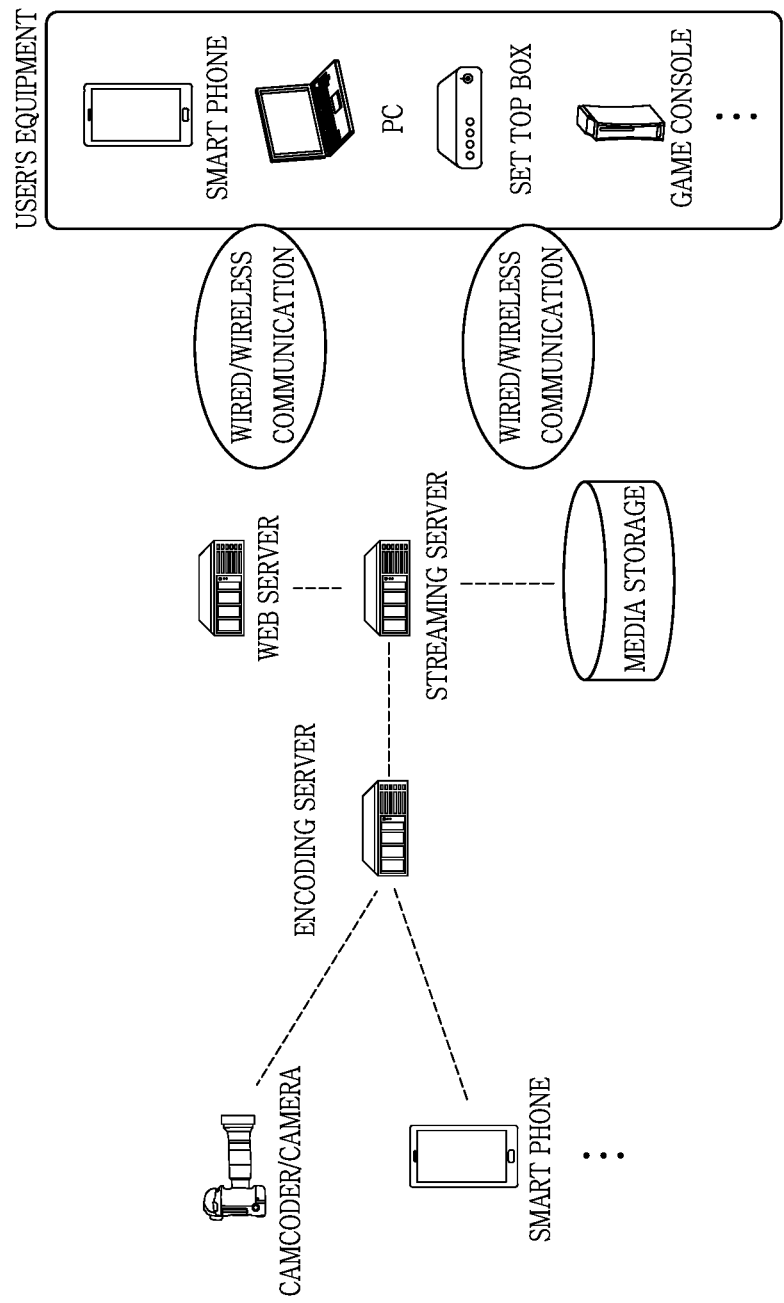
FIG. 19 shows an example of a content streaming system to which the embodiments disclosed in the present disclosure may be applied.

FIG. 19 represents an example of a contents streaming system to which the embodiment of the present document may be applied.

Referring to FIG. 19, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the image decoding method comprising:
    receiving image information including inter prediction mode information through a bitstream;
    generating a merge candidate list of a current block based on the inter prediction mode information;
    deriving motion information of the current block based on a candidate selected from the merge candidate list;
    generating prediction samples of the current block based on the motion information; and
    generating a reconstructed picture based on the prediction samples,
    wherein the image information includes a first enabled flag for a combined inter-picture merge and intra-picture prediction (CIIP) mode and a second enabled flag for a partitioning prediction mode, wherein for the partitioning prediction mode, prediction is performed by partitioning a block, wherein the partitioning includes triangle partitioning,
    wherein a merge data syntax is related to the inter prediction mode information, wherein the merge data syntax included in the image information includes at least one of a regular merge flag related to whether a regular merge mode is applied to the current block, an mmvd merge flag related to whether a merge mode with motion vector difference (MMVD) is applied to the current block and a merge subblock flag related to whether a subblock merge mode is applied to the current block,
    wherein a parsing order of the regular merge flag precedes a parsing order of the mmvd merge flag, and
    wherein based on a value the first enabled flag being equal to 0, a value the second enabled flag being equal to 0, a value of the merge subblock flag being equal to 0 and a value of the mmvd merge flag being equal to 0, the regular merge mode is applied and merge index information for the regular merge mode is included in the merge data syntax.

2. The image decoding method of claim 1, wherein the inter prediction mode information includes a general merge flag, and
    wherein the merge data syntax for the current block is included in the image information based on a value of the general merge flag being 1.

3. The image decoding method of claim 1, wherein the first enabled flag for the CIIP mode and the second enabled mode for the partitioning prediction mode are included in a sequence parameter set (SPS) of the image information.

4. The image decoding method of claim 1, wherein for a case that the value the first enabled flag being equal to 0, the value the second enabled flag being equal to 0, the value of the merge subblock flag being equal to 0 and the value of the mmvd merge flag being equal to 0,
    the regular merge flag with value 1 is not explicitly signaled, the regular merge mode is applied to the current block and the merge index information is included in the merge data syntax.

5. The image decoding method of claim 4, wherein the merge index information is included in the merge data syntax further based on a maximum number of merge candidates for the regular merge mode being greater than 1.

6. An image encoding method performed by an encoding apparatus, the image encoding method comprising:
    determining an inter prediction mode of a current block and generating inter prediction mode information indicating the inter prediction mode;
    generating a merge candidate list of the current block based on the inter prediction mode;
    generating selection information indicating one of candidates included in the merge candidate list; and
    encoding image information including the inter prediction mode information and the selection information,
    wherein the image information includes a first enabled flag for a combined inter-picture merge and intra-picture prediction (CIIP) mode and a second enabled flag for a partitioning prediction mode, wherein for the partitioning prediction mode, prediction is performed by partitioning a block, wherein the partitioning includes triangle partitioning,
    wherein a merge data syntax is related to the inter prediction mode information, wherein the merge data syntax included in the image information includes at least one of a regular merge flag related to whether a regular merge mode is applied to the current block, an mmvd merge flag related to whether a merge mode with motion vector difference (MMVD) is applied to the current block and a merge subblock flag related to whether a subblock merge mode is applied to the current block,
    wherein a parsing order of the regular merge flag precedes a parsing order of the mmvd merge flag, and
    wherein based on a value the first enabled flag being equal to 0, a value the second enabled flag being equal to 0, a value of the merge subblock flag being equal to 0 and a value of the mmvd merge flag being equal to 0, the regular merge mode is applied and merge index information for the regular merge mode is included in the merge data syntax.

7. The image coding method of claim 6, wherein the inter prediction mode information includes a general merge flag, and
    wherein the merge data syntax for the current block is included in the image information based on a value of the general merge flag being 1.

8. The image encoding method of claim 6, wherein the first enabled flag for the CIIP mode and the second enabled mode for the partitioning prediction mode are included in a sequence parameter set (SPS) of the image information.

9. The image encoding method of claim 6, wherein for a case that the value the first enabled flag being equal to 0, the value the second enabled flag being equal to 0, the value of the merge subblock flag being equal to 0 and the value of the mmvd merge flag being equal to 0,
    the regular merge flag with value 1 is not explicitly signaled, the regular merge mode is applied to the current block and the merge index information is included in the merge data syntax.

10. The image encoding method of claim 9, wherein the merge index information is included in the merge data syntax further based on a maximum number of merge candidates for the regular merge mode being greater than 1.

11. A non-transitory computer-readable digital storage medium storing a bitstream generated by an image encoding method, the method comprising:
- determining an inter prediction mode of a current block and generating inter prediction mode information indicating the inter prediction mode;
- generating a merge candidate list of the current block based on the inter prediction mode;
- generating selection information indicating one of candidates included in the merge candidate list; and
- encoding image information to generate the bitstream, wherein the image information includes the inter prediction mode information and the selection information,
- wherein the image information includes a first enabled flag for a combined inter-picture merge and intra-picture prediction (CIIP) mode and a second enabled flag for a partitioning prediction mode, wherein for the partitioning prediction mode, prediction is performed by partitioning a block, wherein the partitioning includes triangle partitioning,
- wherein a merge data syntax is related to the inter prediction mode information, wherein the merge data syntax included in the image information includes at least one of a regular merge flag related to whether a regular merge mode is applied to the current block, an mmvd merge flag related to whether a merge mode with motion vector difference (MMVD) is applied to the current block and a merge subblock flag related to whether a subblock merge mode is applied to the current block,
- wherein a parsing order of the regular merge flag precedes a parsing order of the mmvd merge flag, and
- wherein based on a value the first enabled flag being equal to 0, a value the second enabled flag being equal to 0, a value of the merge subblock flag being equal to 0 and a value of the mmvd merge flag being equal to 0, the regular merge mode is applied and merge index information for the regular merge mode is included in the merge data syntax.

12. A transmission method of data for an image, the method comprising:
- obtaining a bitstream for the image, wherein the bitstream is generated based on determining an inter prediction mode of a current block and generating inter prediction mode information indicating the inter prediction mode, generating a merge candidate list of the current block based on the inter prediction mode, generating selection information indicating one of candidates included in the merge candidate list, and encoding image information including the inter prediction mode information and the selection information; and
- transmitting the data comprising the bitstream,
- wherein the image information includes a first enabled flag for a combined inter-picture merge and intra-picture prediction (CIIP) mode and a second enabled flag for a partitioning prediction mode, wherein for the partitioning prediction mode, prediction is performed by partitioning a block, wherein the partitioning includes triangle partitioning,
- wherein a merge data syntax is related to the inter prediction mode information, wherein the merge data syntax included in the image information includes at least one of a regular merge flag related to whether a regular merge mode is applied to the current block, an mmvd merge flag related to whether a merge mode with motion vector difference (MMVD) is applied to the current block and a merge subblock flag related to whether a subblock merge mode is applied to the current block,
- wherein a parsing order of the regular merge flag precedes a parsing order of the mmvd merge flag, and
- wherein based on a value the first enabled flag being equal to 0, a value the second enabled flag being equal to 0, a value of the merge subblock flag being equal to 0 and a value of the mmvd merge flag being equal to 0, the regular merge mode is applied and merge index information for the regular merge mode is included in the merge data syntax.

* * * * *